(12) United States Patent
Sahin

(10) Patent No.: US 11,156,633 B2
(45) Date of Patent: *Oct. 26, 2021

(54) AFM WITH SUPPRESSED PARASITIC SIGNALS

(71) Applicant: Ozgur Sahin, New York, NY (US)

(72) Inventor: Ozgur Sahin, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/992,086

(22) Filed: Aug. 12, 2020

(65) Prior Publication Data

US 2020/0371134 A1     Nov. 26, 2020

Related U.S. Application Data

(63) Continuation of application No. 15/547,489, filed as application No. PCT/US2017/015192 on Jan. 26, 2017, now Pat. No. 10,794,930.

(51) Int. Cl.
| | |
|---|---|
| *G01Q 10/06* | (2010.01) |
| *G01Q 60/30* | (2010.01) |
| *G01Q 70/10* | (2010.01) |
| *G01Q 60/38* | (2010.01) |

(52) U.S. Cl.
CPC .......... *G01Q 10/065* (2013.01); *G01Q 10/06* (2013.01); *G01Q 60/30* (2013.01); *G01Q 60/38* (2013.01); *G01Q 70/10* (2013.01)

(58) Field of Classification Search
None
See application file for complete search history.

(56) References Cited

U.S. PATENT DOCUMENTS

| | | | | | |
|---|---|---|---|---|---|
| 5,347,854 | A | * | 9/1994 | Martin ................... | G01Q 10/06 73/105 |
| 6,028,305 | A | * | 2/2000 | Minne ..................... | G01Q 70/06 250/234 |

OTHER PUBLICATIONS

Hoffmann et al. "Cross-talk correction in atomic force microscopy" RevSci Instrum. 78, 016101 (2007) (Year: 2007).*

* cited by examiner

*Primary Examiner* — James Choi
(74) *Attorney, Agent, or Firm* — Steven Stupp

(57) ABSTRACT

An AFM that suppress parasitic deflection signals is described. In particular, the AFM may use a cantilever with a probe tip that is offset along a lateral direction from a longitudinal axis of torsion of the cantilever. During AFM measurements, an actuator may vary a distance between the sample and the probe tip along a direction approximately perpendicular to a plane of the sample stage in an intermittent contact mode. Then, a measurement circuit may measure a lateral signal associated with a torsional mode of the cantilever during the AFM measurements. This lateral signal may correspond to a force between the sample and the probe tip. Moreover, a feedback circuit may maintain, relative to a threshold value: the force between the sample and the probe tip; and/or a deflection of the cantilever corresponding to the force. Next, the AFM may determine information about the sample based on the lateral signal.

20 Claims, 15 Drawing Sheets

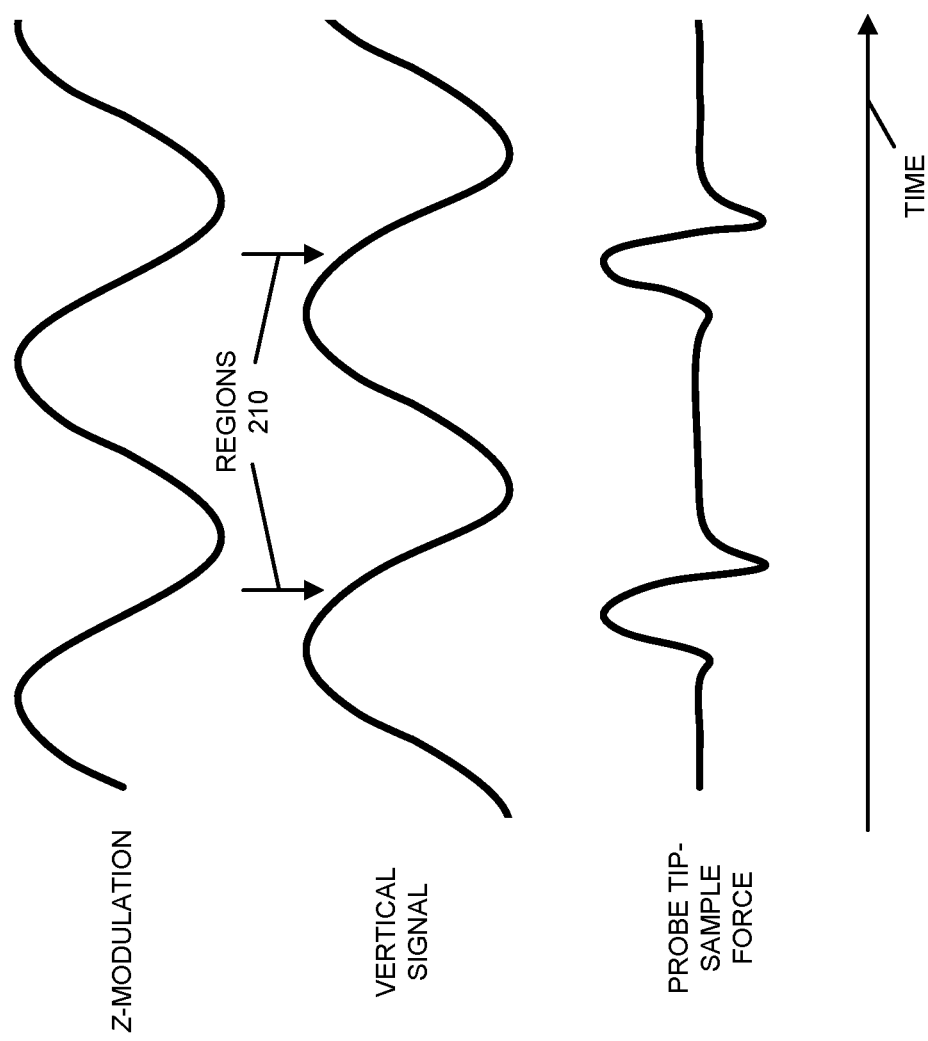

AFM WITH SUPPRESSED PARASITIC SIGNALS

CROSS REFERENCE TO RELATED APPLICATIONS

This application is a continuation of U.S. patent application Ser. No. 15/547,489, "AFM with Suppressed Parasitic Signals," by Ozgur Sahin, filed on Jul. 29, 2017, which claims priority under 35 U.S.C. 371 to International Application No. PCT/US2017/15192, "AFM with Suppressed Parasitic Signals," by Ozgur Sahin, filed on Jan. 26, 2017, the contents of both of which are herein incorporated by reference.

FIELD

The described embodiments relate to a technique for performing Atomic Force microscopy (AFM) measurements with suppressed parasitic deflection signals.

RELATED ART

Scanning probe microscopy encompasses a wide range of imaging techniques. During these imaging techniques, a probe in a scanning probe microscope (SPM) interacts with a sample to generate a detectible signal that corresponds to or is indicative of the interaction. In particular, the probe is often scanned across a surface of the sample to generate images based on the detected signals from the probe. Typically, the probes have very small physical dimensions to improve the resolution of images. In general, the images can reflect the topography and materials properties that vary across the surface.

AFM is a special type of SPM that uses the mechanical interaction of the probe with the sample. In an AFM, the probe typically consists of a flexible cantilever beam (which is sometimes referred to as a 'cantilever') with a sharp probe tip placed on one end. Deflections of the cantilever can be indicative of the forces between the probe tip and the sample. These deflections are usually measured using a quadrant photo-detector based on a laser beam that is reflected from the back of the cantilever.

Because of their ability to obtain high-resolution images under various environmental conditions (including ambient and vacuum), AFMs have proven to be versatile imaging instruments. Some AFMs generate an image of the sample with the probe tip in contact with the sample surface. This imaging mode is commonly referred to as a 'contact mode'. In particular, during the contact mode, the cantilever is typically brought in contact with the sample surface and scanned across the sample. Then, a feedback system in the AFM monitors the deflection of the cantilever and adjusts the relative position of the cantilever with respect to the sample surface to maintain a constant deflection (which is sometimes referred to as 'set point deflection'). The relative adjustment signals provided by the feedback system can correspond to the surface topography, which may be represented in images. Because the cantilever deflection in the contact mode is proportional to the forces exerted on the probe tip and the sample, lower deflection set points are usually desirable in order to minimize damage to the probe tip and the sample. However, if the deflection set point is chosen too low, noise in the AFM detection system and drifts in the measurement signals (e.g., because of thermally induced changes in the cantilever shape) can prevent acquisition of images.

Contact-mode AFM also offers the possibility to differentiate materials forming the sample based on differences in their friction coefficients. For example, in lateral force microscopy, which is based on contact-mode AFM, torsional deflections of the cantilever caused by or associated with frictional forces can be detected to create an image that provides contrast indicative of the frictional characteristics of the sample surface. Typically, the torsional deflection is detected from the measurements signals provided by the quadrant photo-detector in the AFM detection system, which can differentiate lateral and vertical deflections of the cantilever. The lateral signal provided by the quadrant photo-detector is usually sensitive to the torsional deflections of the cantilever (around or about a longitudinal axis of torsion) and the vertical signal at the quadrant photo-detector is typically sensitive to the flexural deflections of the cantilever. Because the cantilever is scanned across the surface while the probe tip is in continuous contact with the sample, frictional forces in contact-mode AFM can become significant and they can damage the probe tip and the sample.

AFMs with intermittent contact modes, such as tapping-mode AFM, largely overcome the limitation of the contact mode with respect to probe tip-sample friction. For example, in tapping-mode AFM, the cantilever is usually vibrated at or near its resonance frequency and brought or placed proximate the sample surface so that the vibrating probe tip makes intermittent contact with the surface. The resulting intermittent interaction reduces the probe-tip vibration amplitude. A feedback mechanism typically adjusts the relative position of the cantilever with respect to the surface in order to maintain the vibration amplitude at a predetermined set-point value. Because the intermittent contact reduces the frictional forces, which can reduce damage to the probe tip and the sample, tapping-mode AFM has become among the most popular AFM imaging modes.

In spite of the advantages of tapping-mode AFM, it can be difficult to operate an AFM in the tapping mode because of the non-linear dynamics of the vibrating cantilever. In general, careful selection of the driving force, frequency, and set point amplitude are typically needed in order to obtain good image quality. One approach for addressing the challenges associated with the tapping mode and the imaging process is peak-force tapping AFM. In peak-force tapping AFM, the distance between the cantilever and the sample is usually varied in an oscillatory or cyclical manner (which is sometimes referred to as 'Z-modulation'). During the Z-modulation, the probe tip approaches, interacts, and retracts from the surface. Moreover, in this process the flexural deflection signals of the cantilever (which are provided by the quadrant photo-detector) can allow substantially simultaneous determination of the probe tip-sample forces. Because the probe tip-sample forces are substantially instantaneously available with the probe-tip deflection, AFMs operating in peak-force tapping mode can use the peak value of the probe tip-sample force interactions in each Z-modulation cycle to control the feedback loop in the feedback system in order to track the topography of the sample surface.

However, because of parasitic deflection signals in the peak-force tapping AFM, measured instantaneous deflection signals often do not directly correspond to the instantaneous probe tip-sample forces. Note that in the following discussion 'parasitic deflection signals' (which are sometimes referred to as 'parasitic signals') are defined as the measurement signals associated with operation of the AFM (e.g., cantilever deflection associated with fluid drag, cantilever deflection associated with acceleration of the cantilever during the Z-modulation, thermal noise of the cantilever, and/or measurement-circuit noise, etc.). In order to address or correct for the parasitic signals, many peak-force tapping AFMs perform a so-called 'recovery step.' During the recovery step, the AFM usually determines and subtracts parasitic deflection signals from the detected deflection signals in order to obtain a deflection signal that is substantially free from parasitic signals.

One recovery-step approach used for determining parasitic signals in peak-force tapping AFM involves lifting the probe tip away from the surface while turning the feedback off. By measuring the background deflection signals in the absence of probe tip-sample interactions, this approach can be used to determine the parasitic signals and subtract the parasitic signals from the detected deflection signals. Then, the feedback can be turned on for imaging. While there are variations on this basic approach for correcting the parasitic signals, the essential feature of this correction technique is that the background parasitic deflection signals are determined when the probe tip is lifted away from the surface. However, the magnitude of some parasitic signals can change depending on the position of the probe tip relative to the surface. For example, the magnitude of viscous drag typically varies with distance between the cantilever and the surface because of squeezed-film effects. Moreover, velocity-dependent drag forces usually change when the probe tip makes contact with the surface because the probe-tip trajectory in time differs from a sinusoid. In contrast, when the cantilever is lifted to prevent interaction with the surface, the probe-tip trajectory in time is usually sinusoidal. Furthermore, there are often long-range probe tip-sample interaction forces, which the recovery step may interpret as parasitic signals and, thus, which may be subtracted from the deflection signals.

These effects often limit the accuracy of the recovery step that is used to subtract parasitic deflection signals. Because one of the primary advantages of peak-force tapping AFMs is the improved feedback control based on peak probe tip-sample forces, the inaccuracies in the recovery step can limit the potential of peak-force tapping AFMs. For example, because of inaccurately determined parasitic signals, the recovered probe tip-sample forces can be larger or smaller than the actual probe tip-sample forces. This error can limit the ability of a peak-force tapping AFM to track the surface topography with low probe tip-sample forces. Moreover, the inaccuracies can result in a loss of probe tip-sample contact, or they can require the use of large forces that can damage the probe tip and/or the sample. In addition, inaccurately determined probe tip-sample force waveforms can reduce the ability to determine and image material properties of the sample, because these measurements often use force-distance curves determined from probe tip-sample forces and probe tip-sample distances.

Consequently, the difficult in accurately determining the parasitic deflection signals can degrade the measurements performed using AFMs, and this can be frustrating to users.

SUMMARY

A first group of embodiments relate to an AFM. This AFM includes: a sample stage that holds a sample; and a cantilever (or an AFM cantilever) with a probe tip that is offset along a lateral direction from a longitudinal axis of torsion of the cantilever. Moreover, the AFM may include a first actuator that varies a distance between the sample and the probe tip along a direction approximately perpendicular to a plane of the sample stage in an intermittent contact mode. Furthermore, the AFM may include a measurement circuit that measures a lateral signal (which is sometimes referred to as a 'lateral deflection signal') associated with a torsional mode of the cantilever during the AFM measurements, the lateral signal corresponding to a force between the sample and the probe tip. Additionally, the AFM may include a feedback circuit that maintains, relative to a threshold value: the force between the sample and the probe tip; and/or a deflection of the cantilever corresponding to the force. For example, the feedback circuit may change the distance between the sample and the probe tip along the direction using the first actuator and/or an optional second actuator (which may be different from the first actuator). Note that the AFM may determine information about the sample based on the lateral signal.

In some embodiments, the measurement circuit measures a vertical signal (which is sometimes referred to as a 'vertical deflection signal') associated with relative displacement, along the direction, of the probe tip and the sample.

Moreover, the AFM may further determine the information based on the vertical signal.

Furthermore, a contribution of parasitic signals to the information may be reduced without the AFM performing a recovery operation or step, the parasitic signals may correspond to phenomena other than probe tip-sample interaction, thermal noise of the cantilever and measurement-circuit noise, and the recovery operation may involve performing measurements when the probe tip is other than in contact with the sample.

Additionally, the information may include: the force between the sample and the probe tip, topography of the sample, and/or a material property of the sample.

Note that the feedback circuit may maintain: a peak force, an average force during a gating interval, and/or a weighted average force during the gating interval.

In some embodiments, the variation of the distance has a fundamental frequency that is less than a flexural resonance frequency of the cantilever. For example, the fundamental frequency may be less than a frequency that corresponds to the flexural resonance frequency, such as significantly less than a lowest flexural resonance frequency (and, thus, the AFM may not be operated in a tapping mode, which may involve driving the cantilever at or near a flexural resonance frequency and the use of the vibration amplitude as the feedback signal). Note that the fundamental frequency may be a lesser of: the flexural resonance frequency divided by a square root of two, and the flexural resonance frequency times one minus an inverse of two times a quality factor of the flexural resonance. However, in some embodiments, the fundamental frequency equals or is proximate to the flexural resonance frequency, and the AFM may operate in a tapping mode, however, with the feedback signal based on the peak force or an instantaneous force. In these embodiments, the feedback signal may be derived or determined from the lateral signal.

Moreover, the AFM may include: a processor that executes a program module; and memory that stores the program module. When executed by the processor, the program module causes the AFM to operate in the intermittent contact mode and to determine the information.

Furthermore, a ratio of an offset of the probe tip along the lateral direction to a cantilever body length may be greater than or equal to 0.235 and/or a ratio of the offset to a cantilever body lateral width may be greater than or equal to 3.

Another embodiment provides a method for determining information about the sample based on the lateral signal, which may be performed by the AFM.

Another embodiment provides a computer-readable storage medium that stores a program module for use with the AFM. When executed by the AFM, the program module causes the AFM to perform at least some of the aforementioned operations.

A second group of embodiments relate to an AFM. This AFM includes: a sample stage that holds a sample; and a cantilever (or an AFM cantilever) with a probe tip that is offset along a lateral direction from a longitudinal axis of torsion of the cantilever. Moreover, the AFM may include an actuator that varies a distance between the sample and the probe tip along a direction approximately perpendicular to a plane of the sample stage in an intermittent contact mode. Furthermore, the AFM may include a measurement circuit that measures a lateral signal associated with a torsional mode of the cantilever during the AFM measurements, and that measures a vertical signal associated with relative displacement, along the direction, of the probe tip and the sample. Note that the lateral signal may correspond to a force between the sample and the probe tip. Note that the AFM may determine information about the sample based on the lateral signal and the vertical signal.

Moreover, a contribution of parasitic signals to the information may be reduced without the AFM performing a recovery operation or step, the parasitic signals may correspond to phenomena other than probe tip-sample interaction, thermal noise of the cantilever and measurement-circuit noise, and the recovery operation may involve performing measurements when the probe tip is other than in contact with the sample.

Furthermore, the information may include: the force between the sample and the probe tip, topography of the sample, and/or a material property of the sample.

Additionally, the variation of the distance may have a fundamental frequency that is less than a flexural resonance frequency of the cantilever. For example, the fundamental frequency may be less than a frequency that corresponds to the flexural resonance frequency, such as significantly less than a lowest flexural resonance frequency (and, thus, the AFM is not operated in a tapping mode, which may involve driving the cantilever at or near a flexural resonance frequency and the use of the vibration amplitude as the feedback signal). Note that the fundamental frequency may be a lesser of: the flexural resonance frequency divided by a square root of two, and the flexural resonance frequency times one minus an inverse of two times a quality factor of the flexural resonance. However, in some embodiments, the fundamental frequency equals or is proximate to the flexural resonance frequency, and the AFM may operate in a tapping mode, however, with the feedback signal based on the peak force or an instantaneous force.

In some embodiments, the AFM includes: a processor that executes a program module; and memory that stores the program module. When executed by the processor, the program module causes the AFM to operate in the intermittent contact mode and to determine the information.

Note that a ratio of an offset of the probe tip along the lateral direction to a cantilever body length may be greater than or equal to 0.235 and/or a ratio of the offset to a cantilever body lateral width may be greater than or equal to 3.

Moreover, the determination may involve correcting for parasitic signals in the lateral signal and the vertical signal, the parasitic signals corresponding to phenomena other than probe tip-sample interaction, thermal noise of the cantilever and measurement-circuit noise.

Another embodiment provides a method for determining information about the sample, which may be performed by the AFM.

Another embodiment provides a computer-readable storage medium that stores a program module for use with the AFM. When executed by the AFM, the program module causes the AFM to perform at least some of the aforementioned operations.

A third group of embodiments provides an AFM cantilever for use with an AFM. This AFM cantilever includes: a cantilever body; and a probe tip that is offset along a lateral direction from a longitudinal axis of torsion of the cantilever. Moreover, the AFM cantilever may have a torsional mode that suppresses parasitic signals, the parasitic signals corresponding to phenomena other than probe tip-sample interaction, thermal noise of the cantilever and measurement-circuit noise.

A fourth group of embodiments relates to an electronic device for use with an AFM. This electronic device includes first input nodes that couple to a measurement circuit in the AFM and that receive, from the measurement circuit, a measurement signal, where the measurement signal includes a lateral signal associated with a torsional mode of a cantilever in the AFM during AFM measurements, and the lateral signal corresponds to a force between a sample and a probe tip in the cantilever. Moreover, the electronic device includes second input nodes that couple to a feedback circuit in the AFM and that receive, from the feedback circuit, a feedback signal, where the feedback signal corresponds to a vertical signal associated with relative displacement, along a direction approximately perpendicular to a plane of the sample, of the probe tip and the sample. Furthermore, the electronic device includes a signal-conditioning circuit that modifies the feedback signal so that the modified signal corresponds to a force between the sample and the probe tip. Additionally, the electronic device includes first output nodes that couple to the feedback circuit and that provide the measurement signal to the feedback circuit, and second output nodes that couple to the measurement circuit and that provide the modified feedback signal to the measurement circuit.

Note that the signal-condition circuit may apply a feedforward modification to the feedback signal.

Another embodiment provides a method for modifying a feedback signal, which may be performed by the electronic device.

Another embodiment provides a computer-readable storage medium that stores a program module for use with the electronic device. When executed by the electronic device, the program module causes the electronic device to perform at least some of the aforementioned operations.

The preceding summary is provided as an overview of some exemplary embodiments and to provide a basic understanding of aspects of the subject matter described herein. Accordingly, the above-described features are merely examples and should not be construed as narrowing the scope or spirit of the subject matter described herein in any way. Other features, aspects, and advantages of the subject matter described herein will become apparent from the following Detailed Description, Figures, and Claims.

BRIEF DESCRIPTION OF THE FIGURES

FIG. 2 is a drawing illustrating an example of Z-modulation, a vertical signal and a probe tip-sample force waveform as a function of time in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
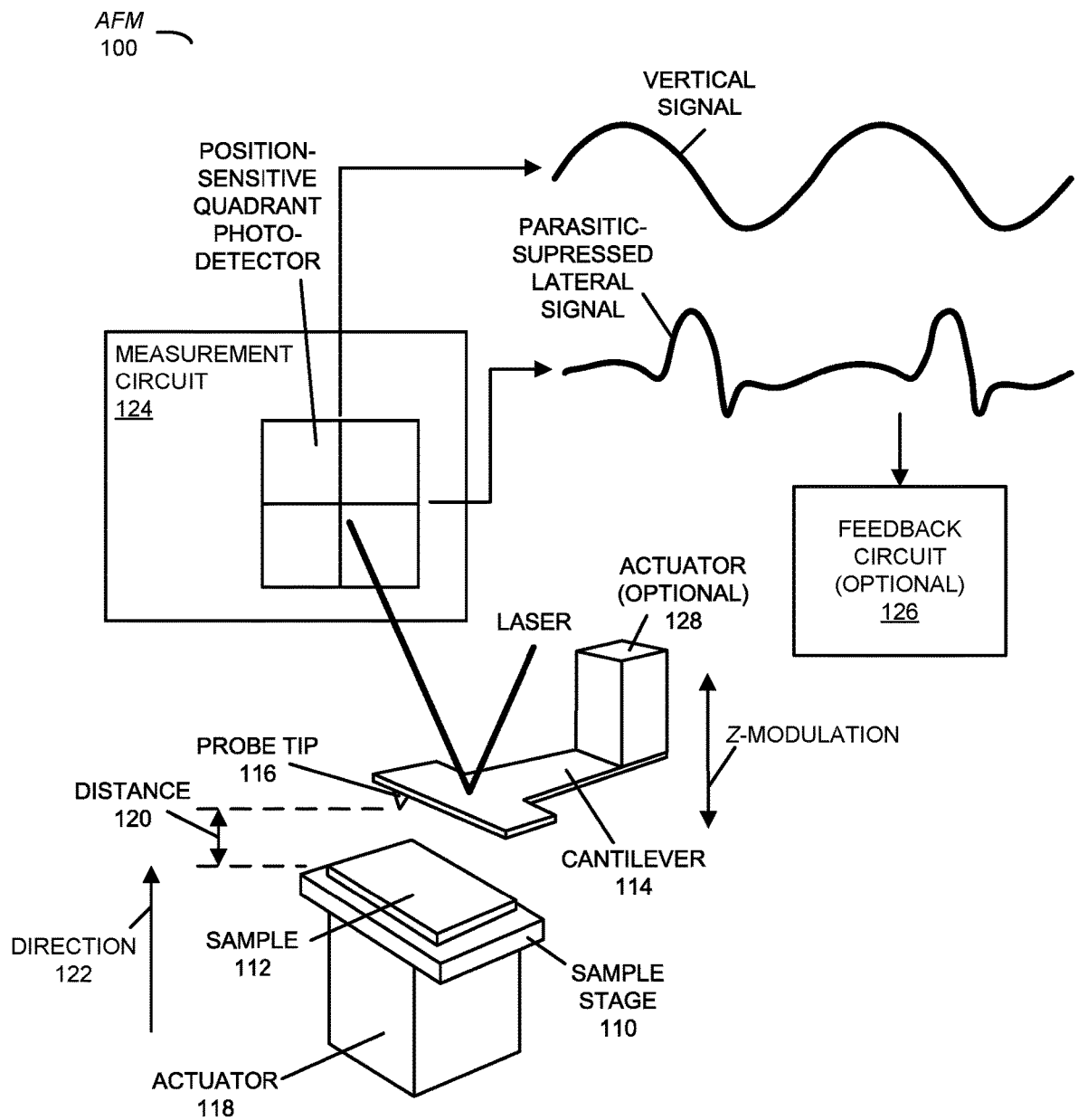
FIG. 1 is a block diagram illustrating an example of an atomic force microscope (AFM) in accordance with an embodiment of the present disclosure.

In a first group of embodiments, an AFM that suppress parasitic deflection signals is described. In particular, the AFM may use a cantilever with a probe tip that is offset along a lateral direction from a longitudinal axis of torsion of the cantilever. During AFM measurements, an actuator may vary a distance between the sample and the probe tip along a direction approximately perpendicular to a plane of the sample stage in an intermittent contact mode. Then, a measurement circuit may measure a lateral signal associated with a torsional mode of the cantilever during the AFM measurements. This lateral signal may correspond to a force between the sample and the probe tip. Moreover, a feedback circuit may maintain, relative to a threshold value: the force between the sample and the probe tip; and/or a deflection of the cantilever corresponding to the force. Next, the AFM may determine information about the sample based on the lateral signal.

In a second group of embodiments, an AFM that suppress parasitic deflection signals is described. In particular, the AFM may use a cantilever with a probe tip that is offset along a lateral direction from a longitudinal axis of torsion of the cantilever. During AFM measurements, an actuator may vary a distance between the sample and the probe tip along a direction approximately perpendicular to a plane of the sample stage in an intermittent contact mode. Then, a measurement circuit may measure a lateral signal associated with a torsional mode of the cantilever during the AFM measurements, and may measure a vertical signal associated with relative displacement, along the direction, of the probe tip and the sample. The lateral signal may correspond to a force between the sample and the probe tip. Next, the AFM may determine information about the sample based on the lateral signal and the vertical signal.

By suppressing the parasitic deflection signals, the measurement technique may improve probe tip-sample force measurement and control during AFM measurements (such as those that use peak force-based feedback). This capability may allow higher Z-modulation fundamental frequencies and, thus, faster imaging speeds (e.g., up to 10× faster) and improved image quality. For example, in AFMs that rely on instantaneous probe tip-sample forces for feedback (such as the magnitude of peak forces), suppressing the parasitic deflection signals may allow topographic imaging with lower forces (such as lower peak forces). Moreover, because various sources of parasitic deflections (such as parasitic deflections due to viscous drag forces and accelerations) depend on the vertical oscillation speed of the cantilever, by suppressing the parasitic deflection signals an AFM can tolerate faster oscillation speeds. Consequently, the measurement technique may allow larger Z-modulation fundamental frequencies and/or oscillation amplitudes than existing AFM measurement techniques with reduced parasitic signals. (Note that typical Z-modulation amplitudes may be between 5 and 200 nm, but larger and smaller amplitudes can also be used.) The resulting shorter oscillation periods may reduce the feedback delay. Therefore, suppressing the parasitic deflection signals can be used to improve the imaging speed, i.e., to achieve a faster scan speed or a faster tip-sample engagement process while keeping the tip-sample forces low. Furthermore, suppressing the parasitic deflection signals may eliminate the need for a recovery step or operation to determine probe tip-sample forces. Additionally, the material properties and topology of the sample may be more accurately determined. For example, suppressing the parasitic deflection signals improves the accurate probe tip-sample force waveforms, which can improve the accuracy of mechanical property measurements based on force-distance curves. Consequently, the measurement technique may provide more flexible and accurate measurements, and may improve the user experience when using the AFM.

We now describe embodiments of an AFM. FIG. 1 presents a block diagram illustrating an example of an AFM 100. This AFM may include: a sample stage 110 that holds a sample 112; a cantilever 114 with a probe tip 116 that is offset along a lateral direction from a longitudinal axis of torsion of the cantilever 114 (e.g., by more than 20 µm); an actuator 118 (such as a piezoelectric element), coupled to sample stage 110 and/or cantilever 114; and a measurement circuit 124 (including a quadrant detector); an optional feedback circuit 126 coupled to measurement circuit 124; and/or an optional actuator 128 coupled to sample stage 110 and/or cantilever 114. Note that optional feedback circuit 126 may be coupled to actuator 118 and/or an optional actuator 128. AFM 100 may be used to perform measurements on a wide variety of samples, including: a biological sample, a polymer, a gel, a thin film, a patterned wafer, a data-storage device, an organic material, and/or an inorganic material. Moreover, the measurements may be performed in ambient, liquid, aqueous buffers, or vacuum.

As described further below with reference to FIG. 14, AFM 100 may include subsystems, such as a networking subsystem, a memory subsystem and a processor subsystem. For example, memory subsystem may store a program module that, when executed by the processor subsystem, causes AFM 100 to perform the measurement technique, which is described further below with reference to FIGS. 2-11. However, as described further below with reference to FIGS. 12-13, in some embodiments AFM 100 is used in conjunction with an electronic device (which is sometimes referred to as an 'instrument module'), which facilitates the measurement technique.

As discussed previously, parasitic deflection signals, e.g., in peak-force tapping AFM c (and, more generally, when Z-modulation is used, rather than driving the cantilever into flexural resonance, and when the feedback relies on peak force, rather than oscillation amplitude), can corrupt measurements of instantaneous deflection signals. Consequently, the instantaneous deflection signals may not directly correspond to the instantaneous probe tip-sample forces.

In order to address this problem, actuator 118 may vary a distance 120, such that associated with translational motion, between sample 112 and probe tip 116 along a direction 122 approximately perpendicular (such as within 15° of perpendicular) to a plane of sample stage 110 in an intermittent contact mode. (In addition, actuator 118 and/or a separate scanner, not shown, may scan probe tip 116 in a plane of sample 112 or along a surface of sample 112 to generate an image.) For example, actuator 118 may vary a distance 120 or impart translational motion between sample 112 and cantilever 114 along a direction 122 using Z-modulation (such as with modulation fundamental frequencies between 250 and 1 kHz, 10 kHz or 20 kHz, and more generally using modulation fundamental frequencies that are typically below the lowest fundamental flexural resonance frequency of cantilever 114), so that probe tip 116 approaches, interacts with and moves away from the surface of sample 112. (Note that this may be in contrast with tapping mode, in which probe tip 116 is moved by exciting a flexural motion of cantilever 114. However, in general during the measurement technique distance 120 may vary because of translational motion and/or excitation of an excitation mode of cantilever 114.) In some embodiments, the variation of distance 120 has a fundamental frequency that is less than a flexural resonance frequency of cantilever 114, such as significantly less than a lowest flexural resonance frequency (i.e., cantilever 114 is operated off-resonance and, thus, AFM 100 may not be operated in a tapping mode, which typically involves driving the cantilever at or near a flexural resonance frequency and the use of the vibration amplitude as the feedback signal). Alternatively or additionally, the fundamental frequency may be less than a frequency that corresponds to the flexural resonance frequency. However, in some embodiments, the fundamental frequency equals or is proximate to the flexural resonance frequency, and thus AFM 100 may be operated in tapping mode, however, with the feedback signal based on the peak force or an instantaneous force. Note that a torsional resonance frequency of cantilever 114 may be between 50 kHz and several MHz.

Then, measurement circuit 124 may measure at least a torsional deflection signal associated with a torsional mode of cantilever 114 during the AFM measurements. For example, if measurement circuit 124 includes a laser and a position-sensitive quadrant photo-detector for deflection detection of cantilever 114, measurement circuit 124 may measure at least a lateral signal associated with a torsional mode of cantilever 114 during the AFM measurements, where the lateral signal corresponds to a force between sample 112 and probe tip 116. (Note that the measured lateral signal in FIG. 1 is distinct from a so-called 'lateral force mode' in which an AFM detects torsional motion associated with probe tip-sample frictional forces or plane forces. In the measurement technique, the torsional deflections of cantilever 114 are due to vertical forces and occur because probe tip 116 is offset along the lateral direction.)

Moreover, optional feedback circuit 126 (such as a proportional-integral controller) may maintain, relative to a threshold value (which is sometimes referred to as 'a set point value'): the force between sample 112 and probe tip 116, and/or a deflection of cantilever 114 corresponding to the force. For example, optional feedback circuit 126 may maintain: a peak force as probe tip 116 interacts with sample 112, an average force during a gating interval as probe tip 116 interacts with sample 112, and/or a weighted average force during the gating interval as probe tip 116 interacts with sample 112. Furthermore, the peak forces, average forces during the gating interval, and/or the weighted average force during the gating interval could be synchronously averaged over many cycles of the fundamental frequency of the tip oscillation. Alternatively, the peak forces, average forces during the gating interval, and/or the weighted average force may be determined from a synchronously averaged tip-sample force waveform at the fundamental frequency of the tip oscillation. The feedback may involve optional feedback circuit 126, using actuator 118 and/or optional actuator 128, changing distance 120 between sample 112 and probe tip 116 along direction 122.

In some embodiments, optional feedback circuit 126 compares a vertical signal from measurement circuit 124 to a threshold. The resulting difference may be input to a proportional control, which outputs a feedback signal to actuator 118 and/or optional actuator 128. In general, the feedback may be based on the force and/or the deflection measured vertical signal. Thus, the feedback signal may correspond to or may be a function of the force and/or the deflection.

As discussed further below, optional feedback circuit 126 may use the peak-force values (without or with reduced parasitic signals) determined from torsional deflection signals to control a feedback loop, e.g., to maintain a constant peak force at each cycle of Z-modulation and to track the surface topography while scanning probe tip 116 over sample 112. Thus, this measurement technique may maintain a steady state interaction by comparing the peak-force value to the set-point value and adjusting the relative distance 120 between probe tip 116 and sample 112 based on the comparison, thereby tracking the surface of sample 112 during the scanning process.

Note that, based on the torsional deflection signal or the lateral signal, a contribution of parasitic signals to the peak-force values may be reduced or eliminated without AFM 100 performing a recovery operation or step, i.e., without determining and subtracting the parasitic signals. The parasitic signals may correspond to phenomena other than probe tip-sample interaction, thermal noise of cantilever 114 and measurement-circuit noise, and the recovery operation, which is typically performed in existing AFMs but may not be performed in the measurement technique, may involve performing measurements when probe tip 116 is other than in contact with sample 112 in order to determine the parasitic signals or the contribution of the parasitic signals. Consequently, the measurement technique is sometimes referred to as a 'parasitic-suppressed AFM mode' or a 'psAFM mode'. In addition, the torsional deflection signal or the lateral signal if a quadrant photo-detector is used in the psAFM mode are sometimes, respectively, referred to as 'parasitic-suppressed torsional deflection signals' or 'parasitic-suppressed lateral signals.' Therefore, this measurement technique may incorporate the advantages of using peak probe tip-sample interaction forces without the limitations of other AFM measurement techniques and without performing the recovery operation or step. Note that the measurement technique may be used for imaging with low forces (such as between 5 pN and 10 nN). However, the measurement technique may be used with larger imaging forces, e.g., as large as 1 µN.

Instead of performing the recovery step or operation, AFM 100 may use a baseline torsional deflection value (or lateral deflection value) to adjust torsional deflection signals (or lateral signals). For example, because of misalignments in a laser position on a photo-detector in measurement circuit 124, there is typically a non-zero, baseline lateral signal. This baseline lateral signal value can be subtracted from measured lateral signal so that lateral signals at the baseline are interpreted as zero deflection and zero force. This may allow long-term imaging with low peak probe tip-sample forces. Moreover, because of drifts in AFM 100 (such as thermal drifts that cause cantilever 114 to bend and twist), the baseline can gradually and slowly change over time. Therefore, in some embodiments, AFM 100 determines the baseline lateral signal repeatedly (such as periodically or after a time interval) to readjust the detected parasitic-suppressed lateral signals. Note that the baseline lateral signal value can be determined from the value of the lateral signal when probe tip 116 is not interacting with the surface of sample 112. However, this can be performed during normal operation of AFM 100, as opposed to intentionally retracting probe tip 116 away from the surface, as is typically the case in the recovery step or operation.

(While the measurement technique allows the parasitic signals to be reduced or eliminated without the use of the recovery step or operation, in some embodiments the measurement technique includes a residual recovery step or operation to estimate and subtract residual parasitic signals in the parasitic-suppressed torsional deflection signals. Because these residual parasitic signals are small in magnitude, uncertainties in their determination can result in even smaller inaccuracies in the final deflection waveform. For example, AFM 100 may: lift probe tip 116 away from the surface of sample 112, measure the background signal, synthesize the background signal and subtract it from the parasitic-suppressed torsional deflection signals.)

Furthermore, AFM 100 may determine information about sample 112 based on the lateral signal. For example, the information may include: the force between sample 112 and probe tip 116, topography of sample 112, and/or a material property of sample 112 (such as an elastic modulus, a stiffness, a work of adhesion, a peak adhesive force, another adhesion metric, a loss modulus, a storage modulus, a hardness, an electrical property, an optical property, etc.). As discussed above, by reducing or eliminating the contribution of the parasitic signals, AFM 100 may determine the information without AFM 100 performing the recovery operation or step.

In order to determine the electrical property or characteristic, AFM 100 may apply a DC or AC voltage signal to probe tip 116 relative to sample 112, so that the measured forces from the parasitic-suppressed torsional deflection signals contain information about the electrical properties of the surface of sample 112, which can be used to determine electrical properties of the surface. By scanning cantilever 114 across the surface of sample 112, these measurements can be used to generate images that map electrical properties of materials, such as the dielectric constant, the resistivity, the electrical impedance, etc.

Moreover, in order to determine an optical property or characteristic, AFM 100 may apply an electromagnetic pulse, an infrared pulse or an optical pulse to probe tip 116 and/or sample 112, so that rapid topographic changes associated with absorption of the pulse can be detected from the parasitic-suppressed torsional deflections. By suppressing parasitic signals, the measurement technique may improve the ability of AFM 100 to detect small and rapid changes in surface height in response to the absorption. This is because the variations in the surface height may result in a change in the probe tip-sample force, which may cause a change in the parasitic-suppressed torsional deflection signal. Furthermore, because the absorption characteristics of sample 112 depends on its chemical composition, the measurement technique may improve the ability to detect chemical changes and also to map the chemical composition of sample 112 with nanometer-scale resolution. Note that, in order to enhance the sensitivity of the measurement technique, the timing of the pulse(s) may be matched with the duration of the probe tip-sample contact during Z-modulation. The temporal width and/or intensity of a pulse can be adjusted to maximize the contrast. By detecting and recording changes in the parasitic-suppressed torsional deflections in response to the applied pulse(s) and scanning cantilever 114 across the surface of sample 112, it may be possible to map the chemical composition of sample 112.

In some embodiments, measurement circuit 124 measures a vertical signal associated with relative displacement, along direction 122, of sample 112 and probe tip 116. This vertical signal is sometimes referred to as a 'flexural signal' or a 'flexural deflection signal.' Moreover, AFM 100 may also further determine the information based on the vertical signal.

For example, AFM 100 may generate at least one force-distance curve and, more generally, at least one force-distance curve at each pixel location of an image. The force values may be determined from the parasitic-suppressed torsional deflection signals, and the distance values may be determined from the displacement of actuator 118 used for the Z-modulation and the flexural deflection signals. The force-distance curves can be used to measure one or more materials properties. By scanning cantilever 114 across the surface of sample 112, these measured quantities can be used to generate images that map composition of materials, which is particularly useful in characterization of heterogeneous materials. Note that the vertical signals may be measured and used in conjunction with the lateral signals to adjust the distance values because of the position of probe tip 116. In particular, this is because the actual position of probe tip 116 relative to the surface is the sum of tip displacements due to flexural and torsional motions, as well as the displacement of actuator 118 used for Z-modulation. Moreover, note that the measurement technique may reduce the uncertainties introduced by the recovery step or operation that is often used to remove the parasitic signals.

In addition to correcting the lateral signals for the baseline lateral signal value, AFM 100 may perform an adjustment to minimize the effects of angular misalignment between the orientation of cantilever 114 and the orientation of the photo-detector in measurement circuit 124. If this angular misalignment is large, it can exacerbate crosstalk from flexural deflections into the lateral signals. Therefore, AFM 100 may perform an adjustment to minimize the angular misalignment, such as by adjusting the photo-detector orientation. Alternatively or additionally, AFM 100 may determine the amount of crosstalk (such as by comparing the vertical signal and the lateral signal from cantilever 114 when it is not interacting with sample 112), and then correcting for the crosstalk.

While the preceding embodiment included the use of feedback (via optional feedback circuit 126, actuator 118 and/or optional actuator 128), in other embodiments the information is determined without the use of feedback. In particular, measurement circuit 124 may measure the lateral signal and the vertical signal. Then, AFM 100 may determine the information about sample 112 based on the lateral signal and the vertical signal. Moreover, the determination may involve correcting for parasitic signals in the lateral signal and the vertical signal. The parasitic signals may correspond to phenomena other than probe tip-sample interaction, thermal noise of cantilever 114 and measurement-circuit noise.

Although we describe AFM 100 as an example, in alternative embodiments, different numbers or types of components may be present. For example, some embodiments comprise more or fewer components. Alternatively or additionally, two or more components may be combined together. Therefore, in some embodiments actuator 118 and optional actuator 128 are combined into a single actuator. However, in other embodiments, actuator 118 and/or optional actuator 128 are separate actuators. There may also be additional actuators (not shown) that are more efficient at higher frequencies.

We now further describe the measurement technique. Peak-force-based AFMs often provide improved control of the imaging process. In particular, instead of relying on the vibration amplitude (as is usually the case in tapping-mode AFMs), the peak-force value can offer a robust technique for detecting probe tip-sample contact. However, parasitic deflection signals can degrade the performance of peak-force-based AFMs by making it difficult to accurately determine probe tip-sample forces.

FIG. 2 presents a drawing illustrating an example of Z-modulation, a vertical signal and a probe tip-sample force waveform as a function of time for a peak-force tapping AFM operating in liquid. As shown in FIG. 2, the Z-modulation signal is often sinusoidal with a fundamental frequency and amplitude.

In general, the probe tip-sample force waveform is usually not directly detectible from the measured vertical deflections. In particular, the probe tip-sample force waveform typically exhibits an alternating pattern of attractive and repulsive forces varying around a baseline value. Moreover, the vertical signal may not follow a clear pattern that can directly reveal the probe tip-sample forces. Instead, there is usually a background signal in addition to the deflection signals that are generated in response to the probe tip-sample forces. In FIG. 2, arrows indicate regions 210 where the probe tip-sample interaction occurs. In this example, the value of the deflection signal in one of these regions is below the peak vertical signal. Therefore, unless probe tip-sample forces are high enough to cause deflection above the background, it may not be possible to directly use the peak vertical signal for feedback control.

Note that the background signals may be parasitic signals that originate from the operation of the AFM (such as from sources other than probe tip-sample interactions). For example, the parasitic signals can include cantilever bending due to viscous drag forces, acceleration due to Z-modulation, and/or laser interference. The parasitic signals are usually oscillatory signals, primarily at the fundamental frequency of the Z-modulation. Moreover, parasitic signals due to laser interference may exhibit frequency doubling. (In this definition, noise from the thermally induced vibrations of the cantilever and photo-detector noise may not be parasitic signals). In addition to the parasitic signals, there may be additional signals due to the excitation of cantilever resonances in response to abruptly changing adhesion forces. These parasitic signals, which are often encountered when imaging takes place in air due to strong capillary forces, are sometimes referred to as 'unwanted signals.' This is because the unwanted signals distort the cantilever deflection signals and can make it difficult to relate deflection signals to probe tip-sample forces.

As noted previously, in order to obtain deflection signals that are free from parasitic signals, existing peak-force tapping AFMs typically employ a recovery step or operation. This recovery step may be performed by a digital controller that includes an analog-to-digital converter, a field programmable gate array (FPGA), and/or a digital signal processor. For example, a background signal associated with AFM operation may be determined by lifting the probe tip up from the surface. Once the background signal is determined, a background generator may synthesize a correction signal that is then subtracted from the detected deflection signal. In addition, existing AFMs may use another operation to determine baseline signals associated with drifts in cantilever deflection and laser position on the photo-detector. This baseline force may be treated separately from parasitic signals. Note that this other operation may be performed so that the zero deflection signal of the baseline-corrected signal corresponds to zero probe tip-sample force.

In contrast, the measurement technique may suppress parasitic signals (e.g., by more than an order of magnitude) so that probe tip-sample forces can be detected more accurately for use in peak force feedback and to facilitate more accurate measurements of materials properties. In particular, the AFM cantilever may respond to vertical probe tip-sample forces by torsional bending (i.e., twisting). Then, during the Z-modulation, torsional deflections of the cantilever may result in deflection signals in which parasitic signals are suppressed relative to the signals that are in response to the probe tip-sample forces.

Figure 3A:
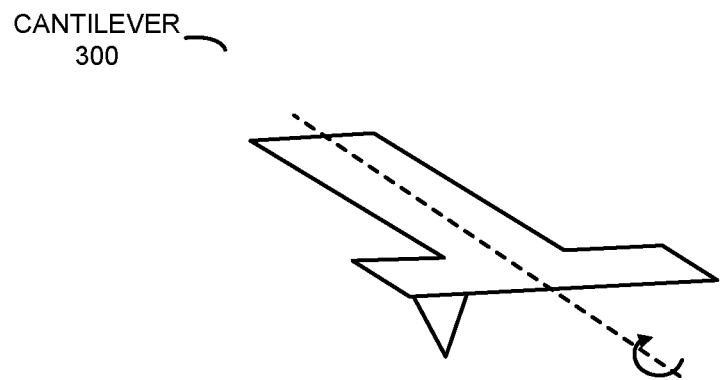
FIG. 3A is a drawing illustrating an example of a cantilever for use with the AFM of FIG. 1 in accordance with an embodiment of the present disclosure.
Figure 3B:
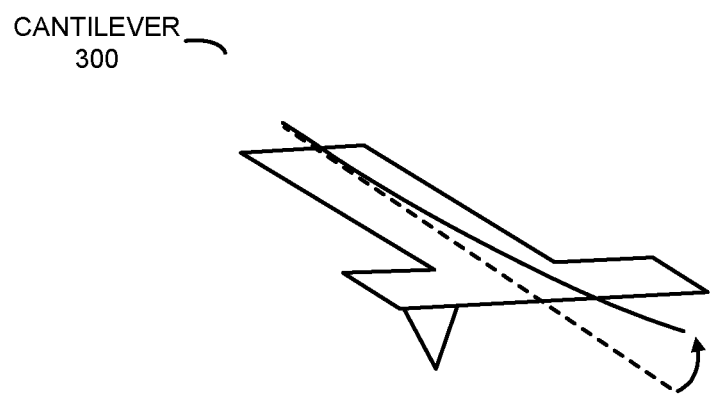
FIG. 3B is a drawing illustrating an example of a cantilever for use with the AFM of FIG. 1 in accordance with an embodiment of the present disclosure.

FIGS. 3A and 3B presents drawings illustrating an example of a T-shaped cantilever 300 for use with AFM 100 (FIG. 1) that strongly respond to vertical probe tip-sample forces by torsional bending. In particular, FIG. 3A illustrates a torsional mode of cantilever 300 and FIG. 3B illustrates a flexural mode of cantilever 300.

Figure 4:
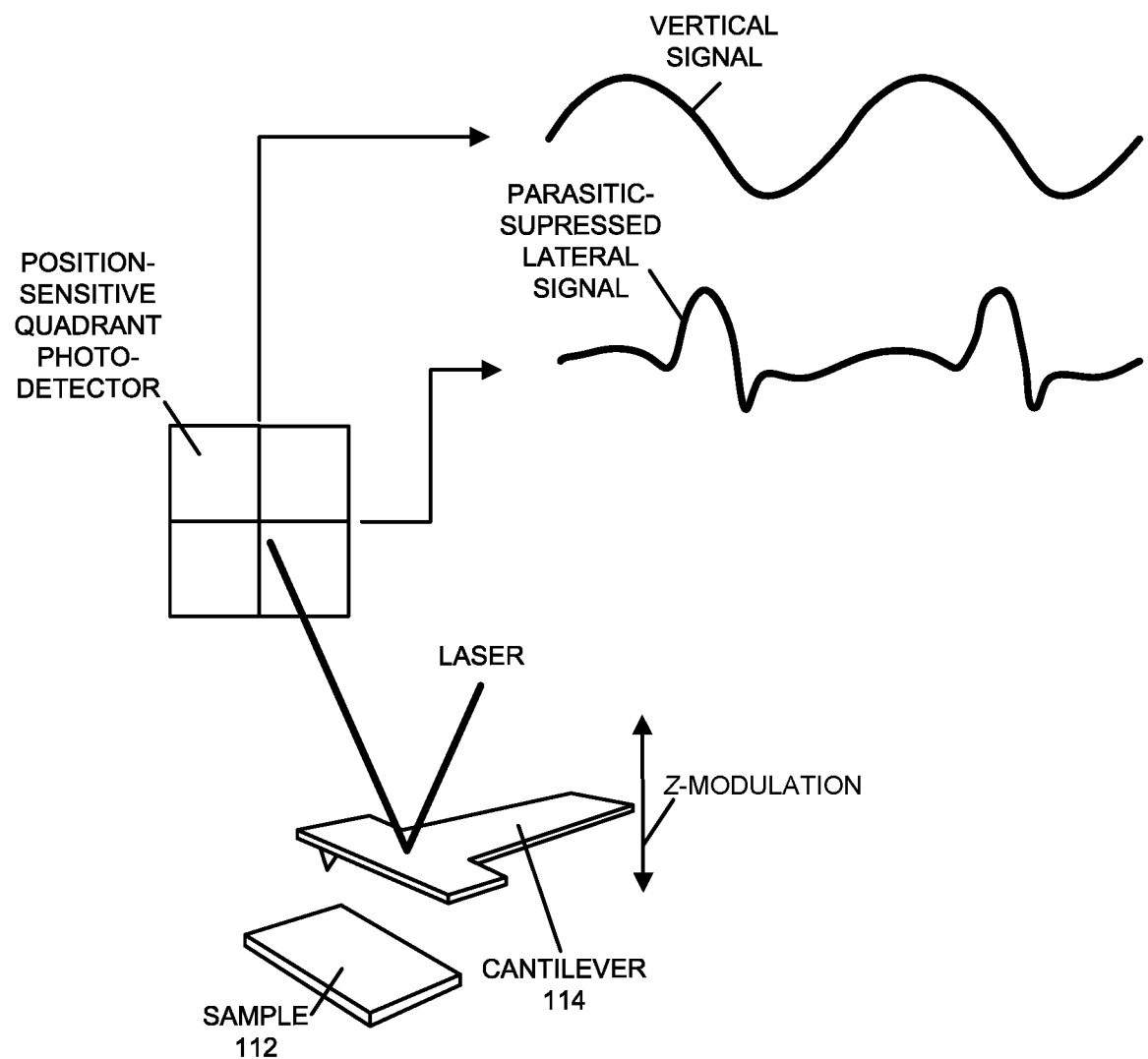
FIG. 4 is a drawing illustrating an example of vertical signal and parasitic-suppressed lateral signal measurements using the AFM of FIG. 1 in accordance with an embodiment of the present disclosure.

FIG. 4 presents a drawing illustrating an example of vertical signal and parasitic-suppressed lateral signal measurements provided by a quadrant photo-detector in peak-force-based AFM 100 (FIG. 1) with a T-shaped cantilever. During Z-modulation, the relative distance between the cantilever and the sample may be modulated using an actuator, so that the probe tip approaches, interacts, and moves away from the sample surface. Deflections of the cantilever in flexural and torsional modes may be detected by the position-sensitive quadrant photo-detector. In particular, the lateral signal from the photo-detector may correspond to the torsional bending of the cantilever, and the vertical signal may correspond to the flexural bending of the cantilever. Moreover, the laterally offset position of the probe tip may cause torsional bending in response to vertical probe tip-sample forces. Furthermore, the cantilever may respond to the probe tip-sample forces by bending in the flexural mode. Therefore, both the vertical and lateral signals may convey or include information about the probe tip-sample forces. However, parasitic signals may be suppressed in the lateral signals. In contrast with the vertical signals, the lateral signals may facilitate the detection of peak forces, as well as in detecting the entire probe tip-sample force waveform.

Figure 5A:
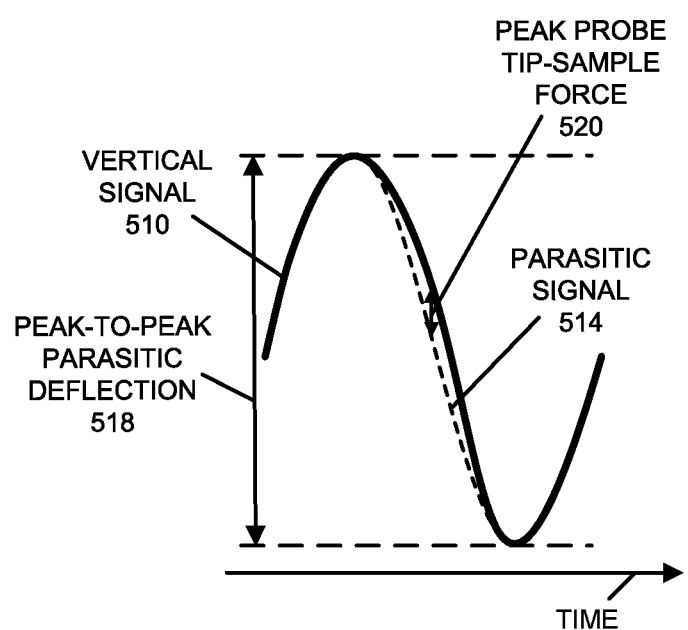
FIG. 5A is a drawing illustrating an example of a vertical signal as a function of time in accordance with an embodiment of the present disclosure.
Figure 5B:
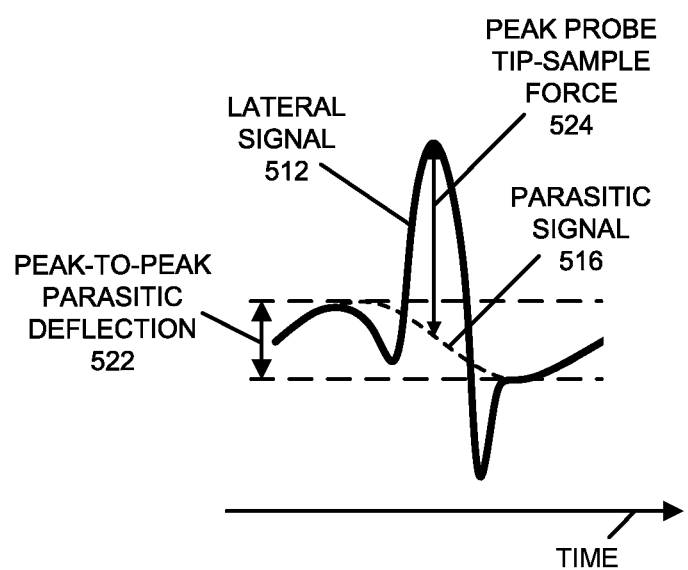
FIG. 5B is a drawing illustrating an example of a lateral signal as a function of time in accordance with an embodiment of the present disclosure.

FIG. 5A presents a drawing illustrating an example of a vertical signal 510 as a function of time. This vertical signal may correspond to flexural bending of a T-shaped cantilever (with the probe tip laterally offset from the longitudinal axis of torsion) in a peak-force-based AFM while interacting with a sample. Moreover, FIG. 5B presents a drawing illustrating an example of a lateral signal 512 as a function of time. This lateral signal may correspond to torsional bending of the T-shaped cantilever in the peak-force-based AFM while interacting with a sample. In FIGS. 5A and 5B, parasitic signals 514 and 516 are shown as dashed lines. Note that parasitic signals 514 and 516 may be estimated by fitting to a sinusoidal waveform. (Alternatively, parasitic signals 514 may be estimated by lifting the cantilever away from the surface using the recovery step or operation.) In some embodiments, the fitting process excludes the contact zone, which is approximately 40% of the Z-modulation period in this example.

Note that peak-to-peak parasitic deflection 518 is substantially larger than vertical signal 510 corresponding to peak force 520. In contrast, peak-to-peak parasitic deflection 522 is substantially less than lateral signal 512 due to peak probe tip-sample force 524. Consequently, by using lateral signal 512 instead of vertical signal 510, parasitic signal 516 is substantially suppressed relative to lateral signal 512 in response to peak probe tip-sample force 524. Therefore, in the measurement technique lower probe tip-sample forces can be detected without using a recovery step or operation. Stated differently, while the same probe tip-sample force generates both vertical and lateral signals 510 and 512, lateral signal 512 rises well above parasitic signal 516 in the lateral channel and vertical signal 510 remains below parasitic signal 514 in the vertical channel. Thus, imaging can be performed with lower probe tip-sample forces without the need for a recovery step or operation.

Figure 6:
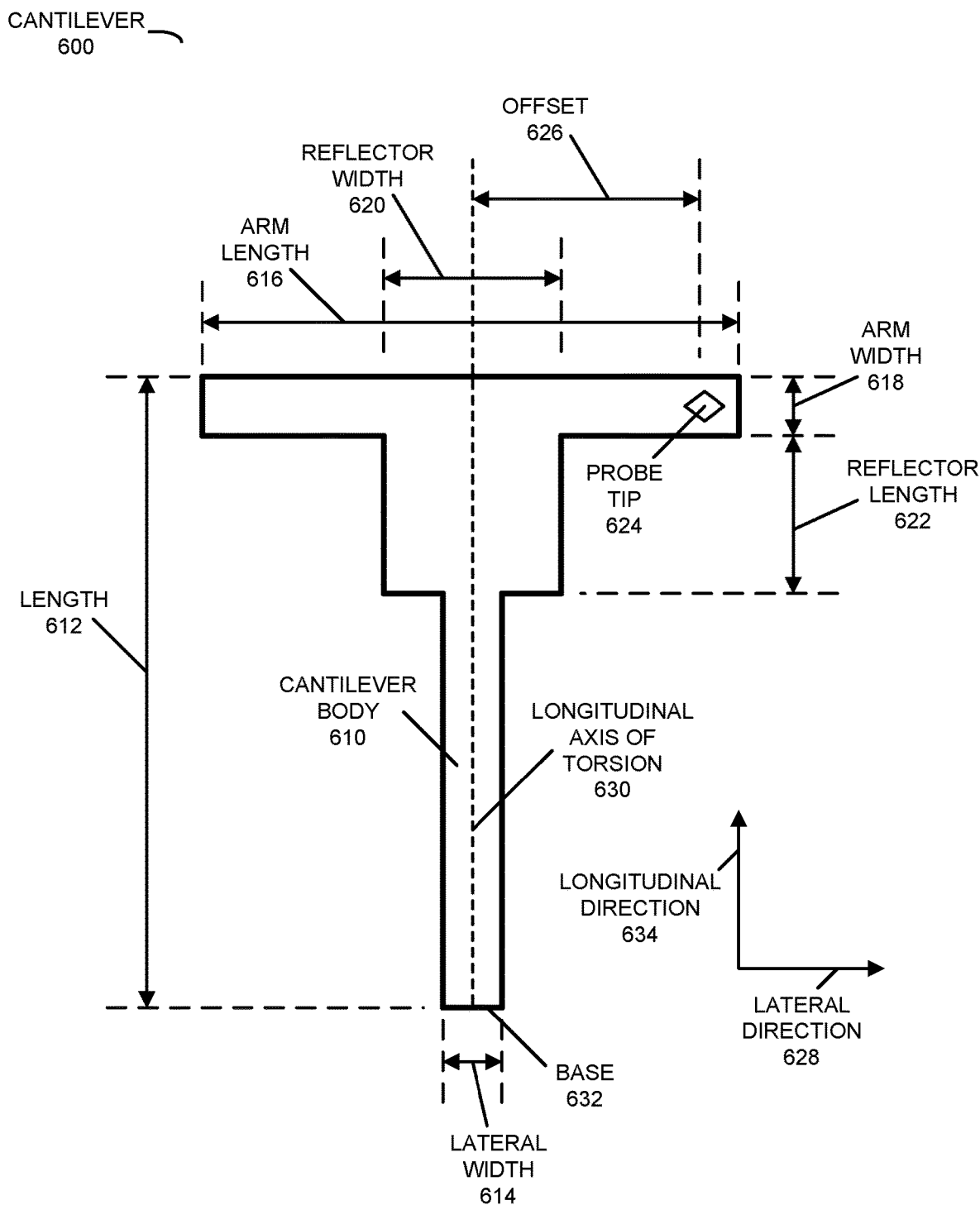
FIG. 6 is a drawing illustrating an example a cantilever for use with the AFM of FIG. 1 in accordance with an embodiment of the present disclosure.

FIG. 6 presents a drawing illustrating an example of a cantilever 600 for use with AFM 100 (FIG. 1). This cantilever includes a cantilever body 610 having: a length 612, a stem or lateral width 614, an arm length 616, an arm width 618, a reflector width 620 and a reflector length 622. Moreover, cantilever 600 may include a probe tip 624 that is offset 626 along a lateral direction 628 from a longitudinal axis of torsion 630 of cantilever 600. Note that cantilever 600 may have a torsional mode that suppresses parasitic signals, where the parasitic signals correspond to phenomena other than probe tip-sample interaction, thermal noise of the cantilever and measurement-circuit noise. Therefore, cantilever 600 may be used to measure parasitic-suppressed torsional deflection signals.

The geometry of cantilever 600 may reduce the parasitic signals and force noise in peak-force-based AFMs without significantly compromising noise performance (e.g., without increasing thermal noise). For example, as a non-limiting example, length 612 may be 115 μm, lateral width 614 may be 9 μm, arm length 616 may be 60 μm, arm width 618 may be 9 μm, reflector width 620 may be 20 μm, reflector length 622 may be 25 μm and offset 626 may be greater than 2 μm (such as 20-30 μm, e.g., 27 μm). Note that offset 626 is intentional and, therefore, is larger than accidental offsets than can occur due to fabrication errors such as mask misalignment. Such unintentional offsets are typically less than 2 μm.

In some embodiments, a ratio of offset 626 of probe tip 624 along lateral direction 628 to a length 612 of cantilever body 610 (which is sometimes referred to as an 'aspect ratio') is greater than or equal to 0.235 or is greater than or equal to 0.4. The aspect ratio may impact the ratio of the torsional spring constant to the flexural spring constant. Note that the spring constants in the torsional and flexural modes each refer to ratio of the force acting on probe tip 624 to the displacement of probe tip 624 in the respective mode. (In general, probe-tip displacement is a superposition of displacements in several flexural and torsional modes, with the dominant ones being the modes with the lowest flexural and torsional resonance frequencies, respectively.) In general, the larger the aspect ratio, the lower the torsional spring constant relative to the flexural spring constant. Therefore, cantilever 600 may have a larger aspect ratio to achieve lower torsional spring constants. In some embodiments, the torsional spring constant is decreased by reducing a thickness of cantilever 600. However, this change may also reduce the flexural spring constant, which may make it difficult for probe tip 624 to detach from the sample surface as the cantilever moves away from the sample. In addition, a lower flexural spring constant can cause a large parasitic signal in the vertical channel. Consequently, the aspect ratio may be used to reduce the torsional spring constant without compromising the performance of cantilever 600 with respect to the suppression of the parasitic signals.

Moreover, a ratio of offset 626 to lateral width 614 of cantilever body 610 (which is sometimes referred to as 'an offset-to-stem ratio') may be greater than or equal to 3. This geometry of cantilever 600 may offer reduced surface area for the same lateral offset 626 and length 612). A reduced surface area may result in lower fluid drag forces, while maintaining a high aspect ratio to keep the torsional spring constant low relative to the spring constant of the fundamental flexural mode. Lower fluid drag forces may reduce: parasitic deflections in the flexural mode; crosstalk from the vertical signal to the lateral signal; and/or the thermal-noise-limited minimum detectible force. These capabilities may allow peak forces to be detected accurately. In this regard, arm width 618, reflector width 620 and reflector length 622 may also be small. In general, the reflector area may be sufficiently large to accommodate a laser spot of the AFM. If the AFM has a sufficiently small laser spot size, the reflector area may be as narrow as lateral width 614. In embodiments where the cantilever edges are not straight lines (so that the lateral width cannot be determined clearly), the average lateral width (i.e., the average width in lateral direction 628) can be used. Because the narrowest regions dominate the torsional spring constant, the averaging may be performed over the regions along length 612 of cantilever 600 whose widths belong to the lowest 50% of the widths along length 612. If there are multiple stems that are connected to the arm that holds probe tip 624 or the reflector area, the width may be calculated as the total width in lateral direction 628 (i.e., the sum over the stems).

Furthermore, the torsional spring constant of the fundamental flexural modes of cantilever 600, which may be defined as the ratio of the force acting on probe tip 624 and along a direction that is perpendicular to the cantilever surface (such as the surface that reflects the laser light used for deflection detection) to the probe-tip displacement caused by torsional deflections, may be between 0.01 and 10,000 N/m. As noted previously, if cantilever 600 has a spring constant that is too low (lower than about 0.01 N/m), it may be difficult to break probe tip-sample contact due to adhesive forces. In addition, if cantilever 600 has spring constant that is too high (higher than about 1,000 N/m), it may be difficult to maintain a low enough peak force during the imaging process. The wide range of spring constants of cantilever 600 may provide the capability to measure and map mechanical properties over a wide range, from 100 Pa to 100 GPa. The lower range may be smaller than the value in existing peak-force tapping AFMs that rely on a recovery step or operation to obtain deflection signals. Thus, cantilever 600 may make it possible to detect probe tip-sample force waveforms on more compliant samples, which may be difficult to measure accurately due to difficulties in the recovery step or operation.

Additionally, cantilever body 610 may include silicon and/or silicon nitride, and probe tip 624 may include silicon, silicon dioxide and diamond. Cantilever 600 may extend from a support structure (not shown) at base 632 of cantilever body 610. Moreover, as a non-limiting example, cantilever body 610 may have a thickness of approximately 600 nm. Furthermore, there may be a gold coating having an approximate thickness of 30 nm on a back surface of cantilever body 610 (facing away from probe tip 624) to enhance reflectivity of the laser beam used in deflection detection. Cantilever 600 may be manufactured using a variety of lithographic fabrication techniques, including additive and subtractive processes. Note that probe tip 624 may be chemically functionalized to alter probe tip-sample interaction forces, e.g., to reduce or enhance capillary forces and/or electrical forces.

As shown in FIG. 6, cantilever 600 may have a T-shape (in addition to the lateral displacement of probe tip 624). However, in other embodiments another geometry may be used to provide parasitic-suppressed torsional deflection signals. In particular, cantilever 600 may have a geometry in which probe tip-sample interaction forces generate sufficient torsional deflection signals to exceed the parasitic signals. In general, the suitability of a particular cantilever geometry for suppressing parasitic signals can be tested in a peak-force tapping AFM (e.g. using vertical signals to determine peak forces for feedback control) and comparing the lateral and vertical signals. If the magnitude of the parasitic signal is smaller than the magnitude of the lateral signal associated with the peak probe tip-sample force (compared to the relative magnitude of the vertical signal), then this cantilever geometry may provide parasitic-suppressed torsional deflection signals. Note that such cantilevers are sometimes referred as 'parasitic-suppressed torsional cantilevers.'

Note that longitudinal axis of torsion 630 may refer to an axis of the cantilever 600 where cantilever 600 is not displaced by torsional vibration when cantilever 600 is vibrate, i.e., the axis of torsion is where cantilever 600 does not move in the torsional mode. More specifically, the axis of torsion generally extends in longitudinal direction 634 of cantilever 600. For a symmetrical cantilever, such as rectangular cantilever 600, the axis of torsion is the centerline of cantilever body 610 perpendicular to base 632 of cantilever 600. However, for a cantilever having a different geometry, the axis of torsion may not necessarily be the centerline of the cantilever body and/or may not be a straight line. Moreover, depending of the placement of probe tip 624, deflection signals corresponding to a positive probe tip-sample force (pointing away from the sample surface towards the probe) can have a positive or negative value. For example, probe tip 624 may be placed on the left side of longitudinal axis of torsion 630 instead of the right side (as shown in FIG. 6), which would cause cantilever 600 to twist in the opposite direction in response to probe tip-sample forces. In the present disclosure, the convention is that positive (repulsive) probe tip-sample forces cause positive torsional deflection signals.

As discussed previously, in addition to using a parasitic-suppressed torsional cantilever to image a sample (including varying the distance between the cantilever and the sample surface so that the probe tip approaches, interacts and moves away from the surface, and measuring vertical and/or lateral signals in which the parasitic signals are suppressed by the torsional mode of the cantilever), the measurement technique may include a residual recovery operation to estimate and remove residual parasitic signals in the parasitic-suppressed torsional deflection signals.

Figure 7:
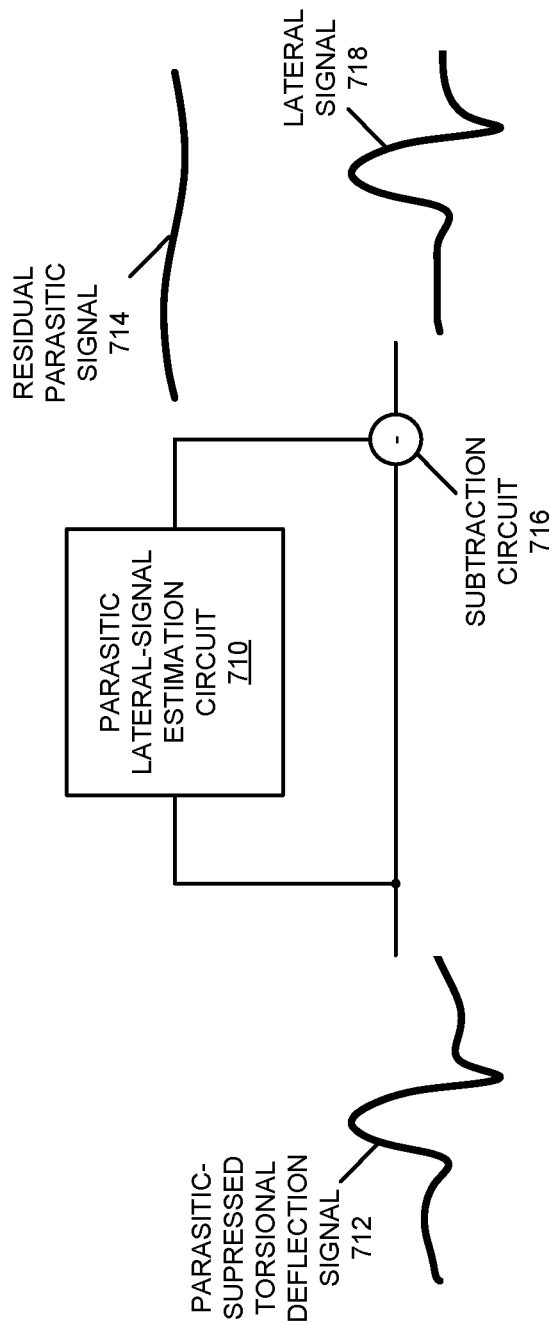
FIG. 7 is a block diagram illustrating an example of a parasitic lateral-signal estimation circuit for use with the AFM of FIG. 1 in accordance with an embodiment of the present disclosure.

This is shown in FIG. 7, which presents a block diagram illustrating an example of a parasitic lateral-signal estimation circuit 700 for use with AFM 100 (FIG. 1). In particular, parasitic lateral signal estimator 710 may use parasitic-suppressed torsional deflection signal 712 to estimate residual parasitic signal 714 in the lateral signals. The estimation operation may include separating the probe tip from the sample while feedback is turned off, measuring the deflection signals in the separated configuration, synthesizing a signal that replicates the measured signals (i.e., residual parasitic signal 714), subtracting the synthesized signal from the detected signals, and turning he feedback on to bring the probe tip back into contact with the sample. In parasitic lateral-signal estimation circuit 700, subtraction circuit 716 may subtract residual parasitic signal 714 from parasitic-suppressed torsional deflection signal 712 to obtain a lateral signal 718 that has lower contribution from parasitic signals, resulting in further improvements in the detection of probe tip-sample forces. The resulting torsional deflection or lateral signal 718 may be used for feedback in a peak-force-based AFM.

Note that the removal of residual parasitic signal 714 in the parasitic-suppressed torsional deflection signal 712 (the aforementioned residual recovery operation) may not be needed for peak-force-based feedback control when parasitic-suppressed torsional signal 712 are used to determine the peak forces. This is because the parasitic signals may already be suppressed substantially, and therefore very small probe tip-sample forces are sufficient to overcome feedback errors introduced by the remaining parasitic signals. However, removal of residual parasitic signals can further improve force-distance curve measurements, which may be used to measure materials properties, such as: adhesion, elasticity, Young's modulus, and/or dissipation.

In some embodiments, an analog approach is used to reduce crosstalk in the measurement technique. In particular, residual parasitic signal 714 in parasitic-suppressed torsional deflection signal 712 can include a crosstalk signal from the vertical signal into the lateral signal. While the residual recovery operation can be used to estimate and remove a residual parasitic signal associated with the crosstalk, separately or additionally the crosstalk may be eliminated using a calibration operation. For example, the crosstalk may be minimized by adjusting the relative orientation of the quadrant photo-detector. In particular, after applying a Z-modulation signal (while the probe tip is separated from the sample), the orientation of the photo-detector may be adjusted to minimize the magnitude of the lateral signal. (Alternatively, this adjustment may be performed electronically.) Because the relative orientation of the cantilever can affect the degree of crosstalk, this calibration operation may be performed after placing a new cantilever in an AFM.

Alternatively or additionally, in some embodiments a digital approach is used to reduce crosstalk in the measurement technique. In particular, while the probe tip is separated from the sample, a Z-modulation signal can be applied, and vertical and lateral detector signals can be analyzed digitally to determine the crosstalk ratio. The crosstalk ratio may be determined by subtracting the respective baseline deflections from each of the vertical and lateral signals. Then, the scalar ratio can be determined based on a linear fit between the resulting lateral signal and the resulting vertical signal (e.g., by using a least-squares fitting technique). Once the crosstalk ratio is determined, the lateral signal may be redefined to account for the crosstalk. For example, the instantaneous vertical signal may be divided by the crosstalk ratio, and then the result may be subtracted from the raw lateral signal to obtain a redefined lateral signal. The redefined lateral signal may also be a parasitic-suppressed torsional deflection signal and its parasitic component may have a lower contribution from crosstalk. Note that the Z-modulation signal may have the fundamental frequency that will be used during the measurement and imaging processes, because the magnitude of the crosstalk may depend on the modulation frequency (e.g., different flexural modes can have different crosstalk ratios and the fundamental frequency of the Z-modulation can affect the relative contributions from each flexural mode to the overall cantilever motion). Therefore, the degree of crosstalk can be minimized while engaging the probe tip to the sample. In some embodiments, the crosstalk ratio is calculated using a field-programmable gate array (FPGA), and the redefined lateral signal is determined from the raw vertical and lateral detector signals using an FPGA. Unlike the residual recovery operation, the calibration operation may reduce the crosstalk independent of the Z-modulation amplitude, because the crosstalk ratio may be substantially independent of the Z-modulation amplitude.

Figure 8:
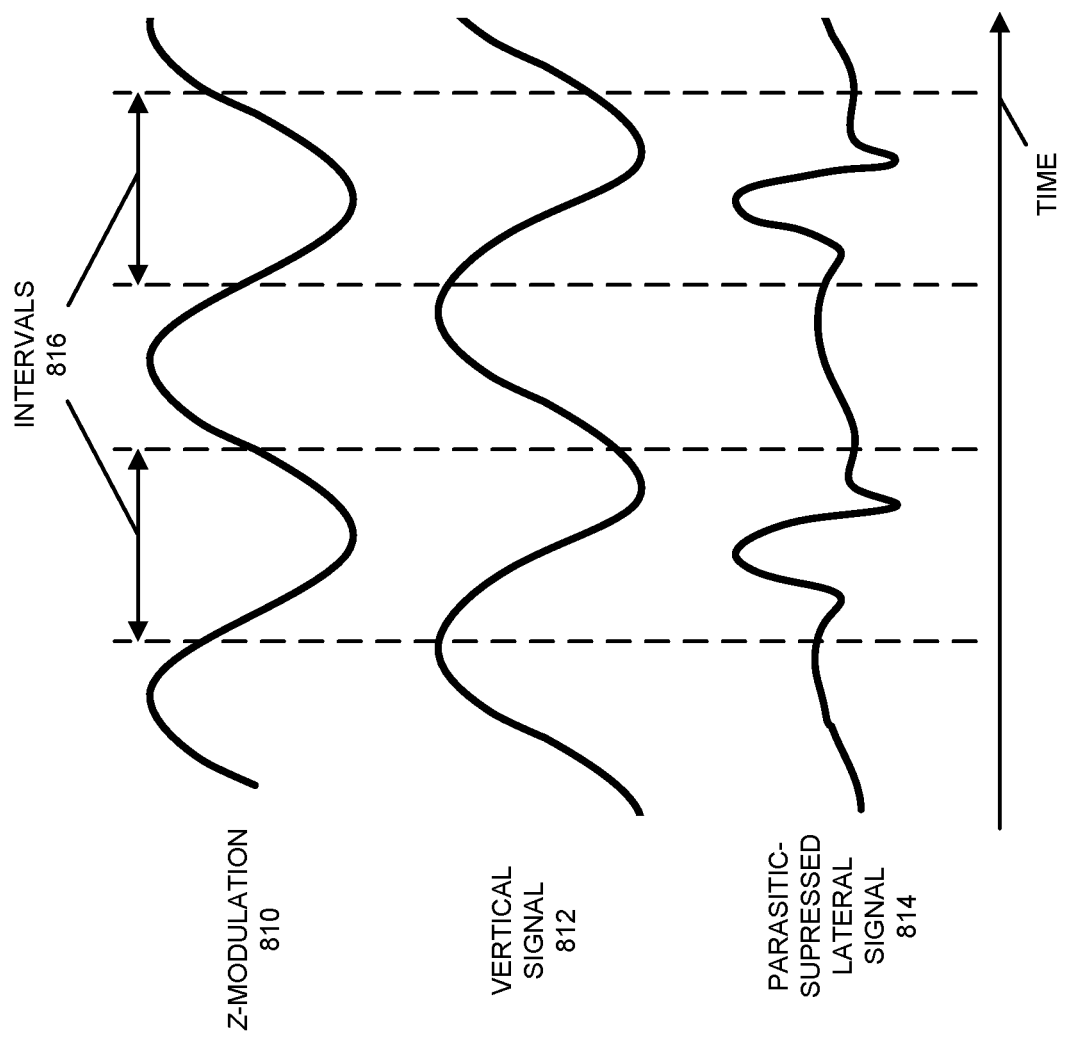
FIG. 8 is a drawing illustrating an example of Z-modulation, a vertical signal and a parasitic-suppressed lateral signal as a function of time in accordance with an embodiment of the present disclosure.

Another approach for estimating the crosstalk ratio during the imaging process involves determining the ratio of the baseline-corrected vertical signal to the baseline-corrected parasitic-suppressed torsional deflection signal using signals that are outside of predetermined intervals (which are sometimes referred to as 'interaction windows') that approximate the duration of the probe tip-sample interaction during Z-modulation. This is shown in FIG. 8, which presents a drawing illustrating an example of Z-modulation 810, a vertical signal 812 and a parasitic-suppressed lateral signal 814 as a function of time. The predetermined intervals 816 may be chosen to be 40% of the period of Z-modulation 810 and they can be centered on a time that corresponds to the peak force value (prior to the subtraction of the residual forces). In compliant regions of samples, the predetermined interval can be chosen to be longer to ensure that the probe tip-sample forces are excluded from the calculation of the crosstalk ratio. Moreover, the crosstalk ratio may be estimated at the beginning of a scanning process during imaging of a sample, and it can be updated using measurements of the vertical and lateral signals during the imaging process. Once the crosstalk ratio is determined, the baseline-corrected vertical signals can be divided by the crosstalk ratio and the result can be subtracted from the baseline-corrected parasitic-suppressed torsional deflection signals to obtain the redefined lateral signals.

In some embodiments, the AFM estimates and subtracts the residual parasitic signals and/or determines the crosstalk ratio and the redefined lateral signals using one or more analog-to-digital (A/D) converters, one or more digital signal processors, and/or one or more FPGAs. By performing the calculations digitally, rapid feedback may be provided based on the peak deflection or force value.

Note that peak-force-based AFMs typically offer improved control and faster feedback relative to tapping-mode AFMs. In contrast with peak-force-based AFMs, tapping-mode AFMs usually rely on changes in the vibration amplitude for feedback, which often exhibit complicated dynamics and slow transients. In peak-force-based AFMs, as soon as the value of peak force is determined, the feedback signal can be adjusted before the oscillation cycle is completed. The feedback loop may use an actuator (such as a piezoelectric actuator) to adjust the relative position of the cantilever and the sample so that the peak force is restored to its set point value in the subsequent cycles of the periodic Z-modulation. Because peak forces are typically encountered when the tip is at its lowest point in its trajectory, the measured value of the parasitic-suppressed torsional deflection signal at this point can be used as the peak force signal. Therefore, A/D converter(s), digital filtering, baseline subtraction, and/or background generation and subtraction can be used with the parasitic-suppressed torsional deflection signals from an AFM operating in peak-force tapping-mode (i.e., by relying on the lateral signal rather than the vertical signal to obtain peak probe tip-sample forces). Note that because the parasitic signals are greatly suppressed in the measurement technique, a recovery step or operation may not be necessary. In addition, additional techniques for determining the feedback control signal (such as a predetermined synchronization distance and/or gated averaging) may be used with the parasitic-suppressed torsional deflection signals.

While the peak force value may be used in the feedback loop, force values at any other time point within the Z-modulation cycle can be used. In these embodiments, the center point of the gating interval (i.e., the time window used to determine the peak force value, such as by averaging forces during the gating interval) may be adjusted to a desired time point. Furthermore, rather than averaging the signals within the gating interval, it is also possible to apply a weighted average. The use of gated averaging may allow exclusion of time points at which the probe tip-sample forces are not substantially larger than noise (e.g., thermal noise) and/or the parasitic deflections. Moreover, the weighted averaging can be used to give larger weights to the time points at which the measured forces are larger than other time points within the gating interval. Furthermore, weighted averaging of other functions of the probe tip-sample force waveform (such as the difference between the maximum and minimum force values) can also be used for the feedback.

While force is the physical quantity representing the interaction between the probe tip and the sample, for the purpose of feedback deflection signals can also be used directly, without determining a calibrated force value. For example, the feedback loop can maintain a peak deflection signal during the imaging process. Alternatively or additionally, parasitic-suppressed torsional deflection signals at other time points within the Z-modulation cycle or a weighted averaging of deflection signals can also be used.

In some embodiments, the parasitic signals in the parasitic-suppressed torsional signals result from crosstalk from the vertical signals. These vertical signals may be due to acceleration as a result of the Z-modulation, fluid-drag forces and/or unwanted excitation of slowly decaying fundamental flexural resonance. The parasitic signals may be reduced by only moving the sample for Z-modulation. This is because, if the cantilever is being moved for Z-modulation (e.g., while keeping sample fixed in the Z direction perpendicular or approximately perpendicular to the sample surface), the actuator may excite resonances if the fundamental frequency is at or near the resonance frequency of a flexural mode. However, many AFMs are equipped with actuators that move the cantilever in the Z direction. This configuration may allow simultaneous imaging using optical microscopy and AFM. In order to further suppress the parasitic signals associated with crosstalk into torsional deflection signals, in an AFM that moves the cantilever for Z-modulation, the modulation fundamental frequency may be less than the fundamental flexural resonance frequency of the cantilever. Alternatively, resonance effects may dominate the probe-tip displacement (and, therefore, the parasitic flexural deflection signals) when the Z-modulation fundamental frequency is within the resonance peak defined by the quality factor of the cantilever. Therefore, the Z-modulation may be kept below the resonance peak. (Choosing a modulation fundamental frequency above the resonance peak may result in the cantilever moving in the opposite direction or out of phase, which may enhance the flexural deflection signal, and therefore the parasitic signals in the lateral deflections due to crosstalk.) Note that the boundaries of the resonance peak can be determined from measurements of the fundamental flexural resonance frequency and its quality factor (such as using the thermal noise spectrum). The frequency at which the cantilever response (such as the amplitude of the thermal noise, or the vibration amplitude if frequency tuning is used) is half of its peak value at the resonance frequency may be the lower boundary of the resonance peak. If the resonance frequency and quality factor of the cantilever are known, the lower bound of the resonance peak can be calculated according to:

$$f_{low} = f_{res} - \frac{f_{res}}{2Q},$$

where $f_{low}$ is the lower bound of the resonance peak, $f_{res}$ is the flexural resonance frequency of the cantilever measured in the imaging fluid, and Q is the quality factor of the fundamental flexural mode. (Note that the parameters may be measured in the imaging medium and in the vicinity of the sample to account for squeezed-film damping effects.) For example, if the resonance frequency of the cantilever is 50 kHz and its Q is 25, then the lower bound is 49 kHz. In this example, the drive or modulation fundamental frequency may be below 49 kHz.

In embodiments that move the sample during the Z-modulation, there may be a benefit in using a Z-modulation fundamental frequency that is below the resonance peak because viscous drag forces can mechanically couple the sample to the cantilever. This effect may be weaker than the effect in embodiments in which the cantilever is moved during the Z-modulation, because acceleration-related excitation of cantilever movements may be prevented.

Figure 9:
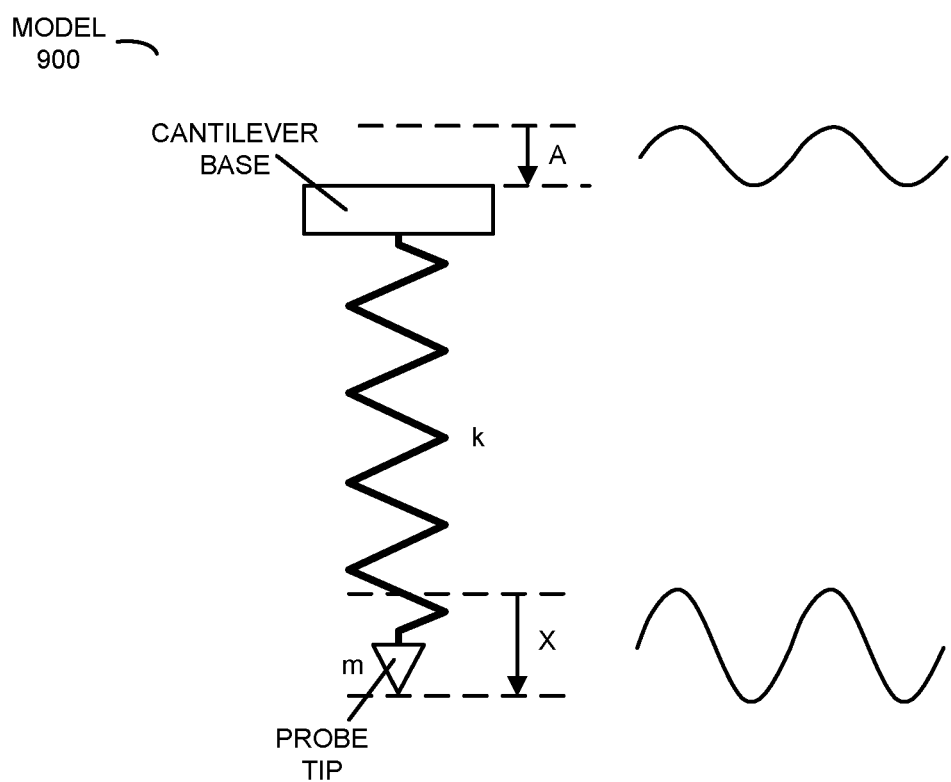
FIG. 9 is a drawing illustrating an example of a model of parasitic flexural deflections during Z-modulation of a cantilever in accordance with an embodiment of the present disclosure.

Although choosing a Z-modulation fundamental frequency below the resonance peak may reduce the crosstalk signals associated with the parasitic excitation of a flexural resonance, choosing an even lower Z-modulation fundamental frequency may keep acceleration-related parasitic flexural deflection of the cantilever small. This is illustrated in FIG. 9, which presents a drawing of an example of a model 900 of parasitic flexural deflections during Z-modulation of a cantilever. In particular, the fundamental flexural mode of the cantilever can be approximated by a damped simple harmonic oscillator (higher-order modes typically have high resonance frequencies and spring constants, and their effects in this analysis are typically negligible). The actuator used for the Z-modulation may move the cantilever base at an angular frequency w. However, while the cantilever body may accelerate according to the base displacement, the probe-tip trajectory (the position versus time curve) may not be identical to the base displacement. In the frequency domain, the equation of motion of the probe-tip mass (e.g., the equation of motion corresponding to the equivalent mass in the simple harmonic oscillator model), which relates the displacement of the probe tip to the displacement of the cantilever base, may be expressed as:

$$X = \frac{A}{\left(1 - \frac{w^2}{w_o^2}\right) - \frac{j \cdot w}{Q \cdot w_o}},$$

where X and A are the frequency-dependent complex (having real and imaginary parts) values corresponding to the probe-tip displacement and cantilever-base displacement (i.e., X and A are the Fourier transforms of the time-dependent displacements), w is the fundamental frequency of Z-modulation, $w_0$ and Q are the resonance frequency and quality factor of the fundamental flexural mode in the medium of imaging, and j is the imaginary unit (i.e., the square root of $-1$). In order to ensure that the cantilever-base displacement dominates the probe-tip displacement (i.e., the parasitic flexural deflections induced by the Z-modulation are less than Z-modulation distance of the base), X and A may be constrained according to $$|X - A| < |A|.$$

In this inequality, the left side is the magnitude of the parasitic flexural deflections and the right side is the magnitude of the cantilever-base modulation distance. Therefore, in order to dominate the probe-tip displacement, the cantilever-base displacement may have to have a larger magnitude than the parasitic flexural deflections. Using the frequency-dependent relationship between X and A, it can be shown that, in order for the above inequality to hold, the Z-modulation fundamental frequency may be less than a threshold frequency, $f_{threshold}$, i.e., $$f_{threshold} = \frac{f_{res}}{\sqrt{2}}.$$

Consequently, in order to ensure that the Z-modulation distance at the cantilever base dominates the probe-tip displacement, the modulation fundamental frequency may be below the threshold frequency (approximately 0.707 times the resonance frequency of the fundamental flexural mode in the imaging medium).

Note that we defined two frequency values (flow and/threshold) to ensure that parasitic signals in the torsional deflection signals are not increased by parasitic flexural deflections via crosstalk of signals. Depending on the quality factor of the fundamental flexural resonance frequency, one or the other frequency value may be smaller. The lower of the two frequency values, which may be defined as the critical frequency $f_{critical}$, may be used in the measurement technique.

In embodiments that use fundamental frequencies at or near a flexural resonance frequency of the cantilever, an analog or a digital technique for crosstalk elimination may be used. By reducing the parasitic signals in the lateral signal, these embodiments may allow the use of fundamental frequencies such as those that are used in the tapping mode, while using the parasitic-suppressed torsional deflection signals (i.e., the lateral signal) to obtain the feedback signal. In these embodiments, the feedback signal may be based on a peak force, an average force during a gating interval, and/or a weighted average force during a gating interval. Furthermore, these forces may be synchronously averaged over many cycles of the fundamental frequency of the tip oscillation. Alternatively, the peak forces, average forces during the gating interval, and/or the weighted average force may be determined from a synchronously averaged tip-sample force waveform at the fundamental frequency of the tip oscillation. By relying on peak forces during the imaging process, this approach may offer faster feedback and more robust operation, in comparison to existing tapping-mode AFM measurement techniques.

Figure 10:
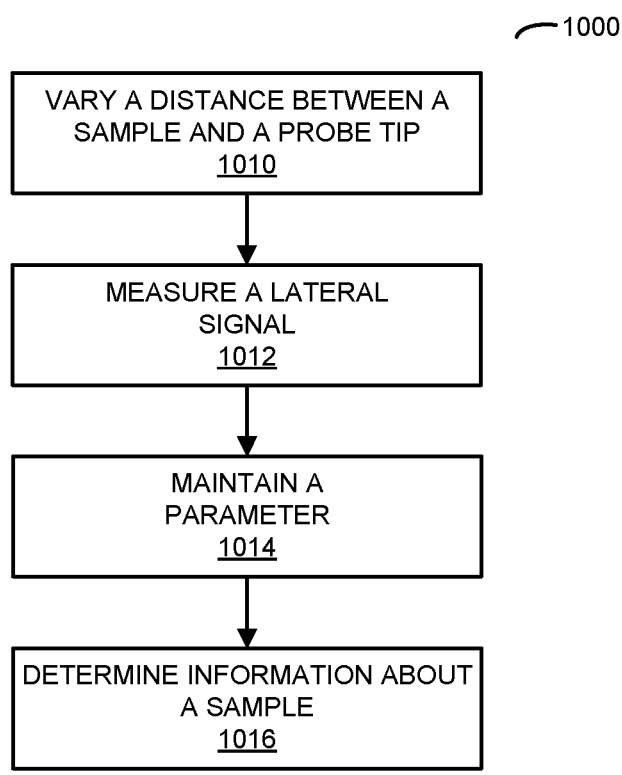
FIG. 10 is a flow diagram illustrating an example of a method for determining information about a sample using the AFM of FIG. 1 in accordance with an embodiment of the present disclosure.

We now describe embodiments of a method in the measurement technique. FIG. 10 presents a flow diagram illustrating an example of a method 1000 for determining information about a sample based on a lateral signal using an AFM, such as AFM 100 (FIG. 1). During operation, the AFM may vary a distance between the sample and a probe tip (operation 1010) along a direction approximately perpendicular to a plane of the sample in an intermittent contact mode, where the probe tip is included in a cantilever and is offset along a lateral direction from a longitudinal axis of torsion of the cantilever. Then, the AFM may measure the lateral signal (operation 1012) associated with a torsional mode of the cantilever during AFM measurements, where the lateral signal corresponds to a force between the sample and the probe tip;

Moreover, the AFM may maintain, using a feedback circuit in the AFM and relative to a threshold value, a parameter (operation 1014), such as: the force between the sample and the probe tip, and/or a deflection of the cantilever corresponding to the force. Note that maintaining the force may involve changing the distance between the sample and the probe tip along the direction.

Next, the AFM may determine the information about the sample (operation 1016) based on at least the lateral signal.

Figure 11:
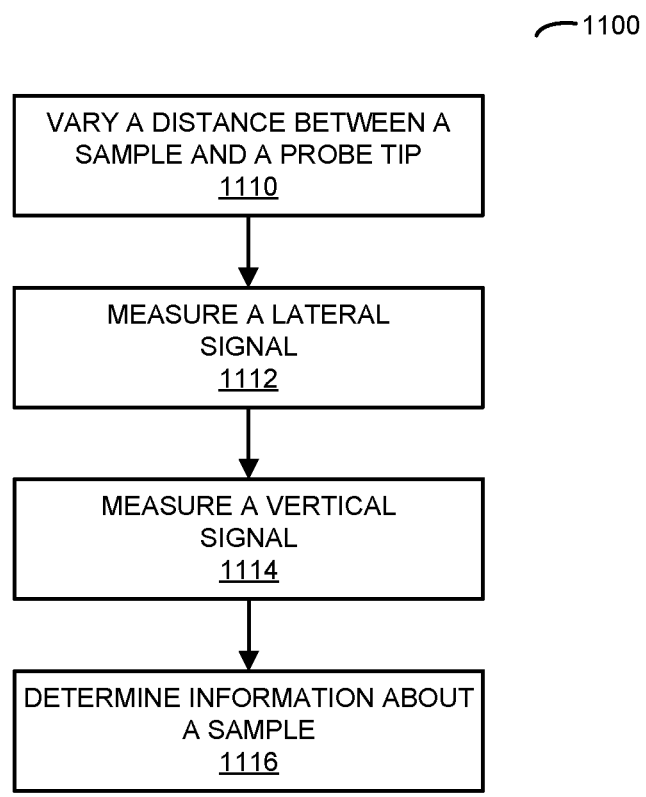
FIG. 11 is a flow diagram illustrating an example of a method for determining information about a sample using the AFM of FIG. 1 in accordance with an embodiment of the present disclosure.

As noted previously, in some embodiments the measurement technique is used without feedback. This is shown in FIG. 11, which presents a flow diagram illustrating an example of a method 1100 for determining information about a sample using an AFM, such as AFM 100 (FIG. 1). During operation, the AFM may vary a distance between the sample and a probe tip (operation 1110) along a direction approximately perpendicular to a plane of the sample in an intermittent contact mode, where the probe tip is included in a cantilever and is offset along a lateral direction from a longitudinal axis of torsion of the cantilever.

Then, the AFM may measure a lateral signal (operation 1112) associated with a torsional mode of the cantilever during AFM measurements and may measure a vertical signal (operation 1114) associated with relative displacement, along the direction, of the probe tip and the sample, where the lateral signal corresponding to a force between the sample and the probe tip.

Next, the AFM may determine the information about the sample (operation 1116) based on the lateral signal and the vertical signal. For example, the information may include material properties derived from force curves obtained using the lateral signal and the vertical signal during Z-modulation (such as from force-distance curves). In some embodiments, the information may include a mapping of other aspects of the probe tip-sample interaction, such as: the indentation distance, energy dissipation (the area inside the force curve), and/or electrical properties if a voltage signal is applied to the probe tip relative to the sample.

Figure 12:
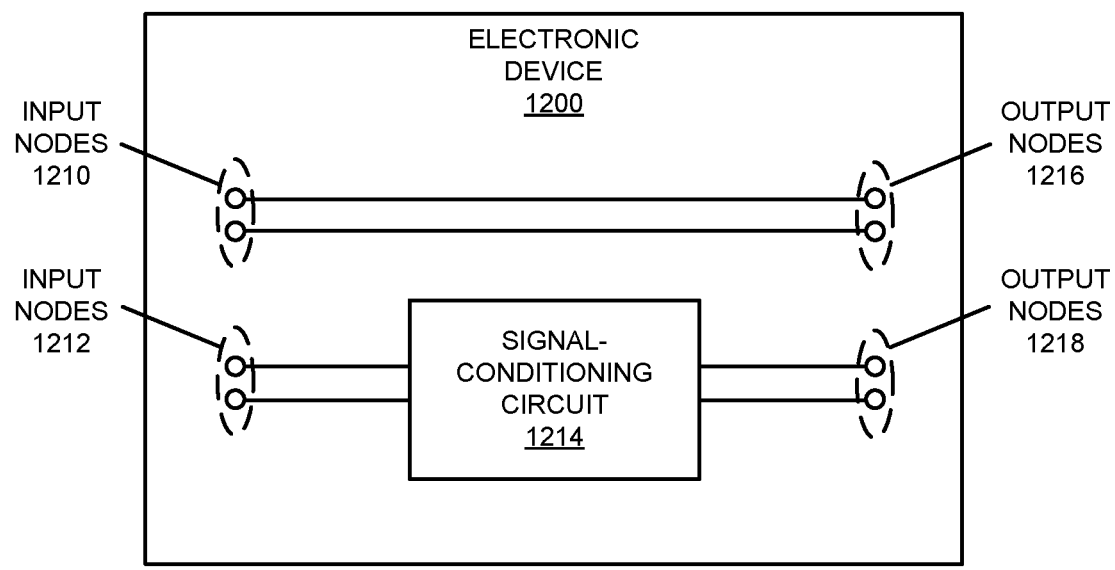
FIG. 12 is a block diagram illustrating an example of an electronic device for use with an AFM in accordance with an embodiment of the present disclosure.

In some embodiments, an electronic device (which is sometimes referred to as an 'instrument module') is used in conjunction with an AFM (which may be an existing AFM) and a parasitic-suppressed torsional cantilever to perform the measurement technique. FIG. 12 presents a block diagram illustrating an example of an electronic device 1200 for use with an AFM, such as AFM 100 (FIG. 1). This electronic device may include input nodes 1210 that couple to a measurement circuit in the AFM and that receive, from the measurement circuit, a measurement signal, where the measurement signal includes a lateral signal associated with a torsional mode of a cantilever in the AFM during AFM measurements, and the lateral signal corresponds to a force between a sample and a probe tip in the cantilever. Moreover, electronic device 1200 may include input nodes 1212 that couple to a feedback circuit in the AFM and that receive, from the feedback circuit, a feedback signal, where the feedback signal corresponds to a vertical signal associated with relative displacement, along a direction approximately perpendicular to a plane of the sample, of the probe tip and the sample. Furthermore, electronic device 1200 may include a signal-conditioning circuit 1214 that modifies the feedback signal so that the modified signal corresponds to a force between the sample and the probe tip. Additionally, electronic device 1200 may include output nodes 1216 that couple to the feedback circuit and that provide the measurement signal to the feedback circuit, and output nodes 1218 that couple to the measurement circuit and that provide the modified feedback signal to the measurement circuit. Note that signal-condition circuit 1214 may apply a feed-forward modification to the feedback signal, which, in part, may be based on a transfer function and/or desired signal conditioning. Thus, electronic device 1200 may provide a deliberately different or modified feedback signal to the AFM. This may overcome a speed limitation of the AFM.

Thus, electronic device 1200 may facilitate process the parasitic-suppressed torsional deflection signal (i.e., the lateral signal) and to provide the AFM with one or more signals including, but not limited to: a feedback error signal, values of materials properties, and/or a waveform derived from the parasitic-suppressed torsional deflection (such as a derived deflection waveform).

In some embodiments, electronic device 1200 receives, from the AFM, one or more additional signals, including: a vertical signal, a Z-modulation signal, signals containing information about the relative position of the sample and the probe tip, an optional electrical bias applied to the probe tip and/or the sample, and/or a trigger signal for electromagnetic and optical pulses applied to the tip and/or the sample. In general, the input signal to and output signals from electronic device 1200 can be analog and/or digital signals.

Note that electronic device 1200 may include one or more processors or micro-controllers, one or more FPGAs, and/or one or more A/D converters that can sample the vertical and lateral signals. The processor(s) and/or FPGAs can use the digitized signals from the A/D converter(s) to process the parasitic-suppressed torsional deflection signal. The processing can include operations such as: determining a crosstalk ratio, obtaining redefined lateral signals from the crosstalk ratio, and/or determining and removing a residual parasitic signal. Moreover, the processing may include filtering and scaling of signals. Furthermore, electronic device 1200 may include one or more digital-to-analog (D/A) converters so that calculated signals can be converted to analog signals.

In some embodiments, electronic device 1200 is interfaced with the AFM such that the feedback error signal calculated by electronic device 1200 (e.g., based on the peak force or peak deflection signal) can replace the original feedback error signal of the AFM. Alternatively or additionally, electronic device 1200 may be interfaced with the AFM such that the waveform calculated by electronic device 1200 (e.g., a derived deflection waveform) can be directly used by the AFM feedback circuit or controller. In this way, the AFM may process the calculated waveform signal to determine its own feedback signal. Note that electronic device 1200 may include additional inputs and/or outputs dedicated to communicate with a computer or workstation (which may be included in or separate from the AFM) to transfer data and to adjust settings of techniques used by the processor(s) and/or the FPGAs.

The preceding apparatuses may include fewer or additional components, the positions of one or more components may be moved two or more components may be combined into a single component and/or a single component may be separated into two or more separate components. For example, electronic device 1200 may include: scaling amplifiers, summing amplifiers, filters, and/or an analog sample-and-hold circuit that samples the deflection signal at a predetermined synchronization distance (such as the synchronization distance that is set to the time when peak forces are observed). The synchronization distance can be determined from the Z-modulation signal input to electronic device 1200 and/or using a peak-detection circuit that processes the parasitic-suppressed torsional signal. Moreover, the output of the sample-and-hold circuit can be provided as one of the outputs of electronic device 1200 to the AFM feedback circuit or controller to be used as the feedback signal. Furthermore, electronic device 1200 may output a signal waveform that is a linearly scaled version of the parasitic-suppressed torsional deflection signal, and the AFM may use this waveform to determine the feedback signal used for tracking the surface topography. Additionally, electronic device 1200 may directly provide the parasitic-suppressed torsional deflection signal to the AFM for use in determining the feedback signal. In these embodiments, electronic device 1200 may essentially swap the vertical signal with the parasitic-suppressed torsional signal or the lateral signal.

Figure 13:
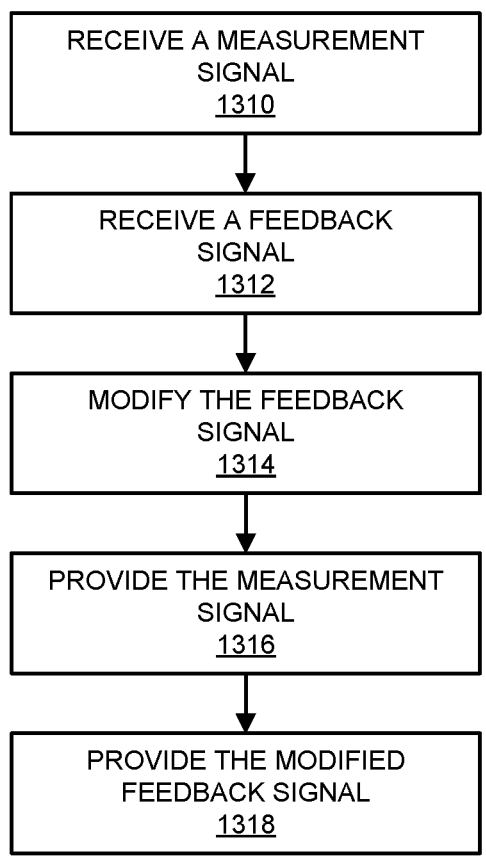
FIG. 13 is a flow diagram illustrating an example of a method for modifying a feedback signal using the electronic device of FIG. 12 in accordance with an embodiment of the present disclosure.
Figure 14:
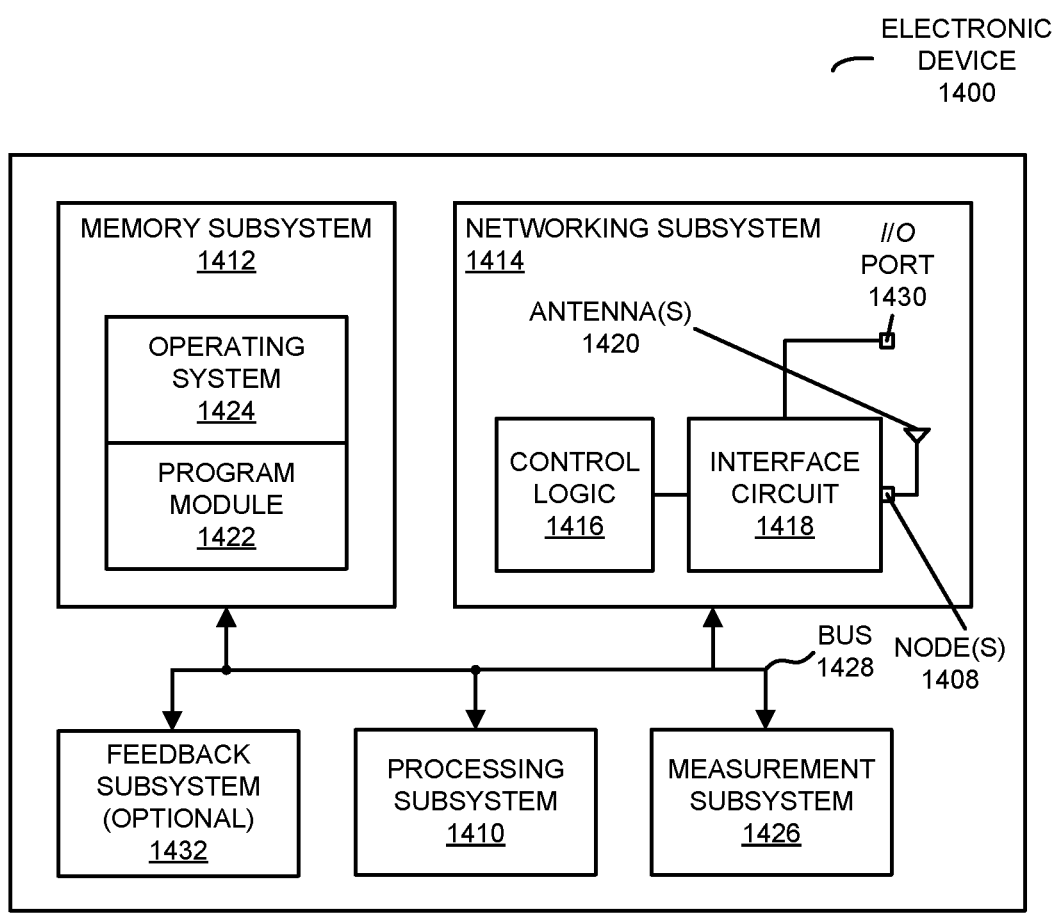
FIG. 14 is a block diagram illustrating an example of an electronic device in accordance with an embodiment of the present disclosure.

FIG. 13 is a flow diagram illustrating an example of a method 1300 for modifying a feedback signal using an electronic device, such as electronic device 1200 (FIG. 12). During operation, the electronic device may receive, on first input nodes from a measurement circuit in an AFM, a measurement signal (operation 1310), where the measurement signal includes a lateral signal associated with a torsional mode of a cantilever in the AFM during AFM measurements, and the lateral signal corresponds to a force between a sample and a probe tip in the cantilever. Moreover, the electronic device may receive, on second input nodes from a feedback circuit in the AFM, a feedback signal (operation 1312), where the feedback signal corresponds to a vertical signal associated with relative displacement, along a direction approximately perpendicular to a plane of the sample, of the probe tip and the sample.

Then, the electronic device may modify, using a signal-conditioning circuit, the feedback signal (operation 1314) so that the modified signal corresponds to a force between the sample and the probe tip. For example, the signal-condition circuit may apply a feed-forward modification to the feedback signal.

Furthermore, the electronic device may provide, on first output nodes, the measurement signal (operation 1316) to the feedback circuit. Additionally, the electronic device may provide, on second output nodes, the modified feedback signal (operation 1318) to the measurement circuit.

In some embodiments of methods 1000, 1100 and/or 1300, there may be additional or fewer operations. Moreover, the order of the operations may be changed, and/or two or more operations may be combined into a single operation. For example, in method 1300, instead of receiving the feedback signal as an input, in some embodiments the signal-conditioning circuit computes the feedback signal based on the measurement signal and provides it to the feedback circuit in the AFM.

We now describe embodiments of an electronic device. FIG. 14 presents a block diagram illustrating an example of an electronic device 1400, such as AFM 100 in FIG. 1. This electronic device includes processing subsystem 1410, memory subsystem 1412, networking subsystem 1414, measurement subsystem 1426 and/or optional feedback subsystem 1432. Processing subsystem 1410 includes one or more devices configured to perform computational operations. For example, processing subsystem 1410 can include one or more microprocessors, one or more GPUs, one or more application-specific integrated circuits (ASICs), one or more microcontrollers, one or more programmable-logic devices (such as FPGAs), and/or one or more digital signal processors (DSPs).

Memory subsystem 1412 includes one or more devices for storing data and/or instructions for processing subsystem 1410 and networking subsystem 1414. For example, memory subsystem 1412 can include dynamic random access memory (DRAM), static random access memory (SRAM), and/or other types of memory. In some embodiments, instructions for processing subsystem 1410 in memory subsystem 1412 include: one or more program modules or sets of instructions (such as program module 1422 or operating system 1424), which may be executed by processing subsystem 1410. Note that the one or more computer programs may constitute a computer-program mechanism. Moreover, instructions in the various modules in memory subsystem 1412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1410.

In addition, memory subsystem 1412 can include mechanisms for controlling access to the memory. In some embodiments, memory subsystem 1412 includes a memory hierarchy that comprises one or more caches coupled to a memory in electronic device 1400. In some of these embodiments, one or more of the caches is located in processing subsystem 1410.

In some embodiments, memory subsystem 1412 is coupled to one or more high-capacity mass-storage devices (not shown). For example, memory subsystem 1412 can be coupled to a magnetic or optical drive, a solid-state drive, or another type of mass-storage device. In these embodiments, memory subsystem 1412 can be used by electronic device 1400 as fast-access storage for often-used data, while the mass-storage device is used to store less frequently used data.

Networking subsystem 1414 includes one or more devices configured to couple to and communicate on a wired and/or wireless network (i.e., to perform network operations), including: control logic 1416, an interface circuit 1418, one or more antennas 1420 and/or input/output (I/O) port 1430. (While FIG. 14 includes one or more antennas 1420, in some embodiments electronic device 1400 includes one or more nodes 1408, e.g., a pad, which can be coupled to one or more antennas 1420. Thus, electronic device 1400 may or may not include one or more antennas 1420.) For example, networking subsystem 1414 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 1414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1400 may use the mechanisms in networking subsystem 1414 for performing simple wireless communication between the electronic devices, e.g., transmitting advertising or beacon frames and/or scanning for advertising frames transmitted by other electronic devices.

Measurement subsystem 1426 may include a parasitic-suppressed torsional cantilever, a driver or an actuator, a laser and/or quadrant photo-detector to perform the measurement technique. Thus, measurement subsystem 1426 may determine the lateral signal and/or the vertical signal. Moreover, optional feedback subsystem 1432 may use at least the lateral signal in a feedback-control loop.

In some embodiments, electronic device 1400 includes a display subsystem (not shown) for displaying information on a display, which may include a display driver and the display, such as a liquid-crystal display, a multi-touch touch-screen, etc. For example, the display may display an image acquired during a scan of a sample.

Within electronic device 1400, processing subsystem 1410, memory subsystem 1412, networking subsystem 1414, measurement subsystem and/or optional feedback subsystem may be coupled together using bus 1428. Bus 1428 may include an electrical, optical, and/or electro-optical connection that the subsystems can use to communicate commands and data among one another. Although only one bus 1428 is shown for clarity, different embodiments can include a different number or configuration of electrical, optical, and/or electro-optical connections among the subsystems.

Electronic device 1400 can be (or can be included in) any electronic device with at least one network interface. For example, electronic device 1400 can be (or can be included in): a desktop computer, a laptop computer, a subnotebook/netbook, a server, a tablet computer, a smartphone, a cellular telephone, a smartwatch, a consumer-electronic device, a portable computing device, an AFM, another measurement device and/or another electronic device.

Although specific components are used to describe electronic device 1400, in alternative embodiments, different components and/or subsystems may be present in electronic device 1400. For example, electronic device 1400 may include one or more additional processing subsystems, memory subsystems, networking subsystems, measurement subsystems, feedback subsystems, display subsystems and/or signal-processing subsystems (such as A/D converters or DIA converters). Additionally, one or more of the subsystems may not be present in electronic device 1400. Moreover, in some embodiments, electronic device 1400 may include one or more additional subsystems that are not shown in FIG. 14. Also, although separate subsystems are shown in FIG. 14, in some embodiments, some or all of a given subsystem or component can be integrated into one or more of the other subsystems or component(s) in electronic device 1400. For example, in some embodiments program module 1422 is included in operating system 1424.

Moreover, the circuits and components in electronic device 1400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of electronic device 1400. Moreover, the integrated circuit may include hardware and/or software components that are used for performing at least some of the operations in the measurement technique.

While AFM is used as an illustrative example of the measurement technique, the described embodiments of the measurement technique may be used in a variety of measurement devices. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the measurement technique may be implemented using program module 1422, operating system 1424, a driver for interface circuit 1418 and/or in firmware in a hardware component in electronic device 1400 (such as firmware in interface circuit 1418). Alternatively or additionally, at least some of the operations in the measurement technique may be implemented in a physical layer, such as hardware in interface circuit 1418.

In the preceding description, we refer to 'some embodiments.' Note that 'some embodiments' describes a subset of all of the possible embodiments, but does not always specify the same subset of embodiments. Moreover, note that the numerical values provided are intended as illustrations of the measurement technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An atomic force microscope (AFM), comprising:
a sample stage configured to hold a sample;
a cantilever with a probe tip, the probe tip being offset along a lateral direction from a longitudinal axis of torsion of the cantilever, wherein the longitudinal axis is along a direction of mechanical coupling of the cantilever to a cantilever base and the lateral direction is perpendicular to the longitudinal axis;
a first actuator, coupled to at least one of the sample stage and the cantilever, configured to vary a distance between the sample and the probe tip along a vertical direction, approximately perpendicular to a plane of the sample stage and the lateral direction, in an intermittent contact mode by modulating the cantilever at least at a fundamental frequency, wherein the vertical direction is different from the lateral direction;
a measurement circuit configured to measure a lateral signal associated with a torsional mode of the cantilever during the AFM measurements, the lateral signal corresponding to a force between the sample and the probe tip, wherein the variation of the distance has the fundamental frequency that equals or is proximate to a lowest flexural resonance frequency of the cantilever; and
a feedback circuit, coupled to the measurement circuit and one of the first actuator and a second actuator, configured to maintain, relative to a threshold value and based on the lateral signal, one of: the force between the sample and the probe tip, and a deflection of the cantilever corresponding to the force,
wherein the AFM is configured to determine information about the sample based on the lateral signal; and
wherein the second actuator is configured to change the distance between the sample and the probe tip along the vertical direction.

2. The AFM of claim 1, wherein the measurement circuit is configured to measure a vertical signal associated with relative displacement, along the vertical direction, of the probe tip and the sample.

3. The AFM of claim 2, wherein the AFM is further configured to further determine the information based on the vertical signal.

4. The AFM of claim 1, wherein a contribution of parasitic signals to the information is reduced without the AFM performing a recovery operation;

wherein the parasitic signals corresponding to phenomena other than probe tip-sample interaction, thermal noise of the cantilever and measurement-circuit noise; and
wherein the recovery operation involves performing measurements when the probe tip is other than in contact with the sample.

5. The AFM of claim 1, wherein the information includes one of: the force between the sample and the probe tip, topography of the sample, and a material property of the sample.

6. The AFM of claim 1, wherein the feedback circuit is configured to maintain one of: a peak force, an average force during a gating interval, and a weighted average force during the gating interval.

7. The AFM of claim 1, wherein the force comprises a peak force.

8. The AFM of claim 1, wherein the AFM further comprises:
a processor, coupled to the measurement circuit and at least one of the first actuator and the second actuator, configured to execute a program module; and
memory, coupled to the processor, configured to store the program module, wherein the program module, when executed by the processor, causes the AFM to operate in the intermittent contact mode and to determine the information.

9. The AFM of claim 1, wherein a ratio of an offset of the probe tip along the lateral direction to a cantilever body length is greater than or equal to 0.235 and a ratio of the offset to a cantilever body lateral width is greater than or equal to 3.

10. The AFM of claim 1, wherein the first actuator is different from the second actuator.

11. A method for determining information about a sample based on a lateral signal, comprising:
varying a distance between the sample and a probe tip along a vertical direction, approximately perpendicular to a plane of the sample and the lateral direction, in an intermittent contact mode, by modulating the cantilever at least at a fundamental frequency, wherein the vertical direction is different from the lateral direction, wherein the probe tip is included in a cantilever and is offset along a lateral direction from a longitudinal axis of torsion of the cantilever, wherein the longitudinal axis is along a direction of mechanical coupling of the cantilever to a cantilever base and the lateral direction is perpendicular to the longitudinal axis, and wherein the variation of the distance has a lowest fundamental frequency that equals or is proximate to a lowest flexural resonance frequency of the cantilever;
measuring the lateral signal associated with a torsional mode of the cantilever during atomic force microscopy (AFM) measurements, the lateral signal corresponding to a force between the sample and the probe tip;
maintaining, using a feedback circuit in the AFM and relative to a threshold value and based on the lateral signal, one of: the force between the sample and the probe tip, and a deflection of the cantilever corresponding to the force, wherein maintaining the force involves changing the distance between the sample and the probe tip along the vertical direction, and
determining the information about the sample based on the lateral signal.

12. The method of claim 11, wherein the method further comprises:
measuring a vertical signal associated with relative displacement, along the vertical direction, of the probe tip and the sample; and
determining the information is further based on the vertical signal.

13. The method of claim 11, wherein a contribution of parasitic signals to the information is reduced without performing a recovery operation;
wherein the parasitic signals corresponding to phenomena other than probe tip-sample interaction and thermal noise of the cantilever and noise associated with a detector that measures the lateral signal; and
wherein the recovery operation involves performing measurements when the probe tip is other than in contact with the sample.

14. The method of claim 11, wherein the feedback circuit maintains one of: a peak force, an average force during a gating interval, and a weighted average force during the gating interval.

15. The method of claim 11, wherein the force comprises a peak force.

16. A non-transitory computer-readable storage medium for use in conjunction with an atomic force microscope (AFM), the computer-readable storage medium configured to store a program module that, when executed by the AFM, causes the AFM to:
vary a distance between a sample and a probe tip along a vertical direction, approximately perpendicular to a plane of the sample and the lateral direction, in an intermittent contact mode by modulating the cantilever at least at a fundamental frequency, wherein the vertical direction is different from the lateral direction, wherein the probe tip is included in a cantilever and is offset along a lateral direction from a longitudinal axis of torsion of the cantilever, wherein the longitudinal axis is along a direction of mechanical coupling of the cantilever to a cantilever base and the lateral direction is perpendicular to the longitudinal axis, and wherein the variation of the distance has a fundamental frequency that equals or is proximate to a lowest flexural resonance frequency of the cantilever;
measure a lateral signal associated with a torsional mode of the cantilever during atomic force microscopy (AFM) measurements, the lateral signal corresponding to a force between the sample and the probe tip;
maintain, using a feedback circuit in the AFM and relative to a threshold value and based on the lateral signal, one of: the force between the sample and the probe tip, and a deflection of the cantilever corresponding to the force, wherein maintaining the force involves changing the distance between the sample and the probe tip along the vertical direction, and
determine information about the sample based on the lateral signal.

17. The computer-readable storage medium of claim 16, wherein, when executed by the AFM, the program module causes the AFM to:
measure a vertical signal associated with relative displacement, along the vertical direction, of the probe tip and the sample; and
determine the information further based on the vertical signal.

18. The computer-readable storage medium of claim 16, wherein a contribution of parasitic signals to the information is reduced without performing a recovery operation;
wherein the parasitic signals corresponding to phenomena other than probe tip-sample interaction and thermal noise of the cantilever and noise associated with a detector that measures the lateral signal; and
wherein the recovery operation involves performing measurements when the probe tip is other than in contact with the sample.

19. The computer-readable storage medium of claim 16, wherein the feedback circuit maintains one of: a peak force, an average force during a gating interval, and a weighted average force during the gating interval.

20. The computer-readable storage medium of claim 16, wherein the force comprises a peak force.

* * * * *